US012655951B2

(12) United States Patent
Zuo et al.

(10) Patent No.: US 12,655,951 B2
(45) Date of Patent: Jun. 16, 2026

(54) LIGHTING DEVICE

(71) Applicant: Nanjing Chervon Industry Co., Ltd., Nanjing (CN)

(72) Inventors: Changwei Zuo, Nanjing (CN); Zhenxing Tai, Nanjing (CN); Lai Liu, Nanjing (CN); Han Yan, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 18/975,827

(22) Filed: Dec. 10, 2024

(65) Prior Publication Data

US 2025/0251099 A1 Aug. 7, 2025

(30) Foreign Application Priority Data

Feb. 4, 2024 (CN) ......................... 202410160784.8
Feb. 4, 2024 (CN) ......................... 202410171517.0
Feb. 4, 2024 (CN) ......................... 202420273293.X

(51) Int. Cl.

| | |
|---|---|
| ***F21L 4/04*** | (2006.01) |
| ***F21V 3/02*** | (2006.01) |
| ***F21V 15/01*** | (2006.01) |
| ***F21V 17/02*** | (2006.01) |
| ***F21V 21/08*** | (2006.01) |
| ***F21V 21/40*** | (2006.01) |
| ***F21V 23/00*** | (2015.01) |
| ***F21V 23/04*** | (2006.01) |

(52) U.S. Cl.
CPC ................ *F21L 4/04* (2013.01); *F21V 3/023* (2013.01); *F21V 15/01* (2013.01); *F21V 21/0832* (2013.01); *F21V 23/003* (2013.01); *F21V 23/04* (2013.01); *F21V 17/02* (2013.01); *F21V 21/40* (2013.01)

(58) Field of Classification Search
CPC .. F21L 4/04; F21V 3/023; F21V 15/01; F21V 21/0832; F21V 23/003; F21V 23/04
See application file for complete search history.

(56) References Cited

U.S. PATENT DOCUMENTS

| | | | | |
|---|---|---|---|---|
| 4,893,221 | A * | 1/1990 | Friedman | F21V 23/0414 362/108 |
| 5,072,347 | A * | 12/1991 | Brunson | F21V 19/02 362/306 |
| 5,871,272 | A * | 2/1999 | Sharrah | F21L 4/027 362/228 |
| 10,371,326 | B2 * | 8/2019 | Grandadam | F21V 21/145 |
| 2004/0264181 | A1 * | 12/2004 | Woolfson | G01P 3/40 362/157 |
| 2006/0120086 | A1 * | 6/2006 | Yuen | F21V 15/01 362/276 |

(Continued)

*Primary Examiner* — Bryon T Gyllstrom
(74) *Attorney, Agent, or Firm* — Greenberg Traurig, LLP

(57) ABSTRACT

A lighting device includes a light housing; a light source disposed at least partially in the light housing; a battery pack with a height dimension H1 defined; and a battery pack receiving portion formed on or connected to the light housing. The light housing includes a first state with a height dimension H2 and a second state with a height dimension H3 along a height direction of the light housing, the height dimension H2 in the first state is less than the height dimension H3 in the second state, and the height dimension H2 in the first state is less than or equal to the height dimension H1 of the battery pack.

20 Claims, 12 Drawing Sheets

(56) References Cited

U.S. PATENT DOCUMENTS

| | | | | |
|---|---|---|---|---|
| 2006/0158874 | A1* | 7/2006 | Maglica | F21L 4/027<br>362/188 |
| 2007/0030672 | A1* | 2/2007 | Offiler | F21L 4/04<br>362/396 |
| 2012/0033415 | A1* | 2/2012 | Sharrah | F21V 21/0965<br>362/199 |
| 2014/0118997 | A1* | 5/2014 | Snyder | F21L 4/08<br>362/183 |
| 2022/0090768 | A1* | 3/2022 | Westling | F21S 9/02 |

* cited by examiner

LIGHTING DEVICE

RELATED APPLICATION INFORMATION

This application claims the benefit under 35 U.S.C. § 119(a) of Chinese Patent Application No. 202410160784.8, filed on Feb. 4, 2024, Chinese Patent Application No. 202410171517.0, filed on Feb. 4, 2024, and Chinese Patent Application No. 202420273293.X, filed on Feb. 4, 2024, which applications are incorporated herein by reference in their entireties.

BACKGROUND

In the related art, worklights are used to provide light for illumination in work regions with poor light. Generally, mains electricity is inconvenient to provide in these regions. Meanwhile, lighting devices like the worklights are required to frequently move in the same space or move from one work space to another work region.

This part provides background information related to the present application, and the background information is not necessarily the existing art.

SUMMARY

A lighting device includes a light housing; a light source disposed at least partially in the light housing; a battery pack with a height dimension H1 defined; and a battery pack receiving portion formed on or connected to the light housing. The light housing includes a first state with a height dimension H2 and a second state with a height dimension H3 along a height direction of the light housing, the height dimension H2 in the first state is less than the height dimension H3 in the second state, and the height dimension H2 in the first state is less than or equal to the height dimension H1 of the battery pack.

In some examples, the ratio of the height dimension H3 in the second state to the height dimension H1 of the battery pack is greater than or equal to 1.5.

In some examples, the battery pack, the battery pack receiving portion, and the light housing define a height dimension of the lighting device, and when the light housing is in the first state, the ratio of a height dimension Hf of the lighting device to the height H1 of the battery pack is less than 2.5.

In some examples, when the light housing is in the second state, the ratio of a height dimension Hex of the lighting device to the height H1 of the battery pack is greater than or equal to 2.5.

In some examples, the light housing defines a central axis, a direction of the central axis is parallel to the height direction, and the light housing extends and shortens along the direction of the central axis.

In some examples, the light housing includes a flexible housing including a flexible material.

In some examples, the flexible housing includes flexible portions in multiple layers, and the flexible portions decrease in dimension layer by layer along a radial direction of the flexible housing.

In some examples, the flexible housing deforms to remain in the first state or the second state.

In some examples, folds are distributed on the flexible housing.

In some examples, the light housing further includes a mounting portion for forming or connecting the battery pack receiving portion, and the mounting portion supports the flexible housing.

In some examples, the light housing forms an accommodation space, the accommodation space includes a first accommodation portion consistent in volume in the first state and the second state and a second accommodation portion changing in volume in the first state and the second state, and the lighting device further includes an air pressure balancing portion so that air pressure in the second accommodation portion remains basically unchanged when the second accommodation portion changes in volume.

In some examples, the air pressure balancing portion includes air holes for making the inside of the second accommodation portion communicate with the outside of the second accommodation portion.

In some examples, at least part of the air holes are disposed on the battery pack receiving portion.

In some examples, a porous dust pad is provided on each of the air holes.

In some examples, a hook is provided on the mounting portion, the hook includes an unfolded state, and the hook in the unfolded state keeps the lighting device suspended with the battery pack facing upward.

In some examples, the hook in the unfolded state keeps the lighting device suspended in a vertical direction and with the battery pack facing upward.

In some examples, the hook includes a stored state in which the hook is close to the mounting portion and the unfolded state in which the hook is away from the mounting portion, and the mounting portion is provided with locking portions configured to keep the hook in the stored state and the unfolded state.

In some examples, the hook switches between the stored state and the unfolded state through translation and rotation.

In some examples, when the hook is in the unfolded state, the midpoint of a hanging portion of the hook is located above the center of gravity of the lighting device.

In some examples, the mounting portion is provided with a support portion, the support portion includes a support surface, the support surface is located above the light source, and when the light housing is in the first state, the support portion keeps the light housing above the light source.

In some examples, the light source includes one or more light-emitting diodes (LEDs), and the light source forms, through the light housing, light extending by 360° around the central axis.

In some examples, the battery pack is detachably connected to the battery pack receiving portion, the battery pack receiving portion includes a first port, and the nominal voltage of the battery pack is greater than or equal to 10.8 V.

In some examples, the first port is adapted to a first battery pack with a first nominal voltage and a second battery pack with a second nominal voltage, where the first nominal voltage is different from the second nominal voltage.

In some examples, the lighting device further includes a power button for controlling the light source to be lit and extinguished; a controller coupled to the light source and configured to control the light source; and a control circuit board on which the controller, the power button, the light source, and the first port are disposed.

In some examples, the control circuit board is disposed at least partially in the light housing.

In some examples, the lighting device further includes a charging port disposed on the control circuit board and a charging port cover pivotally connected to the light housing.

In some examples, the light source is configured to produce light of 50 lumens to 450 lumens.

A lighting device includes a light housing; a light source disposed at least partially in the light housing; a battery pack receiving portion formed on or connected to the light housing; and a battery pack detachably connected to the battery pack receiving portion and having a height dimension H1 defined. The light housing includes a flexible lampshade, the light housing includes a first state with a height dimension H2 and a second state with a height dimension H3 along a height direction of the light housing, and the height dimension H2 in the first state is less than the height dimension H3 in the second state. The battery pack, the battery pack receiving portion, and the light housing define a height dimension of the lighting device, and when the light housing is in the first state, the ratio of a height dimension Hf of the lighting device to the height H1 of the battery pack is less than 2.5.

In some examples, when the light housing is in the second state, the ratio of a height dimension Hex of the lighting device to the height H1 of the battery pack is greater than or equal to 2.5.

In some examples, when the light housing is in the first state, the ratio of the height dimension Hf of the lighting device to the height H1 of the battery pack is less than or equal to 2.

A lighting device includes a light housing; a light source disposed at least partially in the light housing; a battery pack receiving portion formed on or connected to the light housing; and a battery pack detachably connected to the battery pack receiving portion and couplable to a power tool to power the power tool after the battery pack is detached. The light housing defines a central axis, a direction of the central axis is parallel to a height direction of the lighting device, and the light housing extends and shortens along the direction of the central axis.

A lighting device includes a light housing; a light source disposed at least partially in the light housing; a battery pack receiving portion formed on or connected to the light housing and including a first port; a battery pack detachably connected to the battery pack receiving portion and coupled to the first port; a controller coupled to the light source and configured to control the light source; and a control circuit board disposed at least partially in the light housing, where the controller, the light source, and the first port are disposed on the control circuit board.

In some examples, the light housing includes a first state and a second state with different height dimensions along a height direction of the light housing.

In some examples, the nominal voltage of the battery pack is greater than or equal to 10.8 V.

In some examples, a power button for controlling the light source to be lit and extinguished is further included, and the power button is disposed on the control circuit board.

A lighting device includes a light housing; a light source disposed at least partially in the light housing; a handle housing rotatably connected to the light housing around a first axis; a battery pack receiving portion formed on or connected to the handle housing; a battery pack detachably connected to the battery pack receiving portion; a power button for controlling the light source to be lit and extinguished, where the power button is disposed at an end of the light housing facing away from the first axis; a controller coupled to the light source and configured to control the light source; and a control circuit board accommodated in the light housing, where the controller and the light source are disposed on the control circuit board.

In some examples, the handle housing includes a first connecting portion, the first connecting portion is provided with a first spindle whose centerline is the first axis, and the light housing is rotatably connected to the handle housing around the first axis.

In some examples, the light housing includes a first accommodation portion, and the control circuit board is disposed in the first accommodation portion.

In some examples, the light housing includes a second connecting portion, the second connecting portion is rotatably connected to the first connecting portion, and the first accommodation portion is rotatably connected to the second connecting portion around a second axis.

In some examples, the power button is disposed on the control circuit board.

In some examples, a hanging portion is disposed at an end of the handle housing facing away from the battery pack receiving portion.

In some examples, the battery pack receiving portion includes a first port, and the first port is adapted to a first battery pack with a first nominal voltage and a second battery pack with a second nominal voltage, where the first nominal voltage is different from the second nominal voltage.

In some examples, the nominal voltage of the battery pack is greater than or equal to 10.8 V.

In some examples, the light source is configured to produce light of 250 lumens to 600 lumens.

A lighting device includes a light housing; a light source disposed at least partially in the light housing; a handle housing rotatably connected to the light housing; a battery pack receiving portion formed on or connected to the handle housing, where the battery pack receiving portion and the light housing are disposed at two ends of an extension direction of the handle housing one to one; a battery pack detachably connected to the battery pack receiving portion; a controller coupled to the light source and configured to control the light source; and a control circuit board accommodated in the light housing, where the controller and the light source are disposed on the control circuit board.

DETAILED DESCRIPTION

Figure 1:
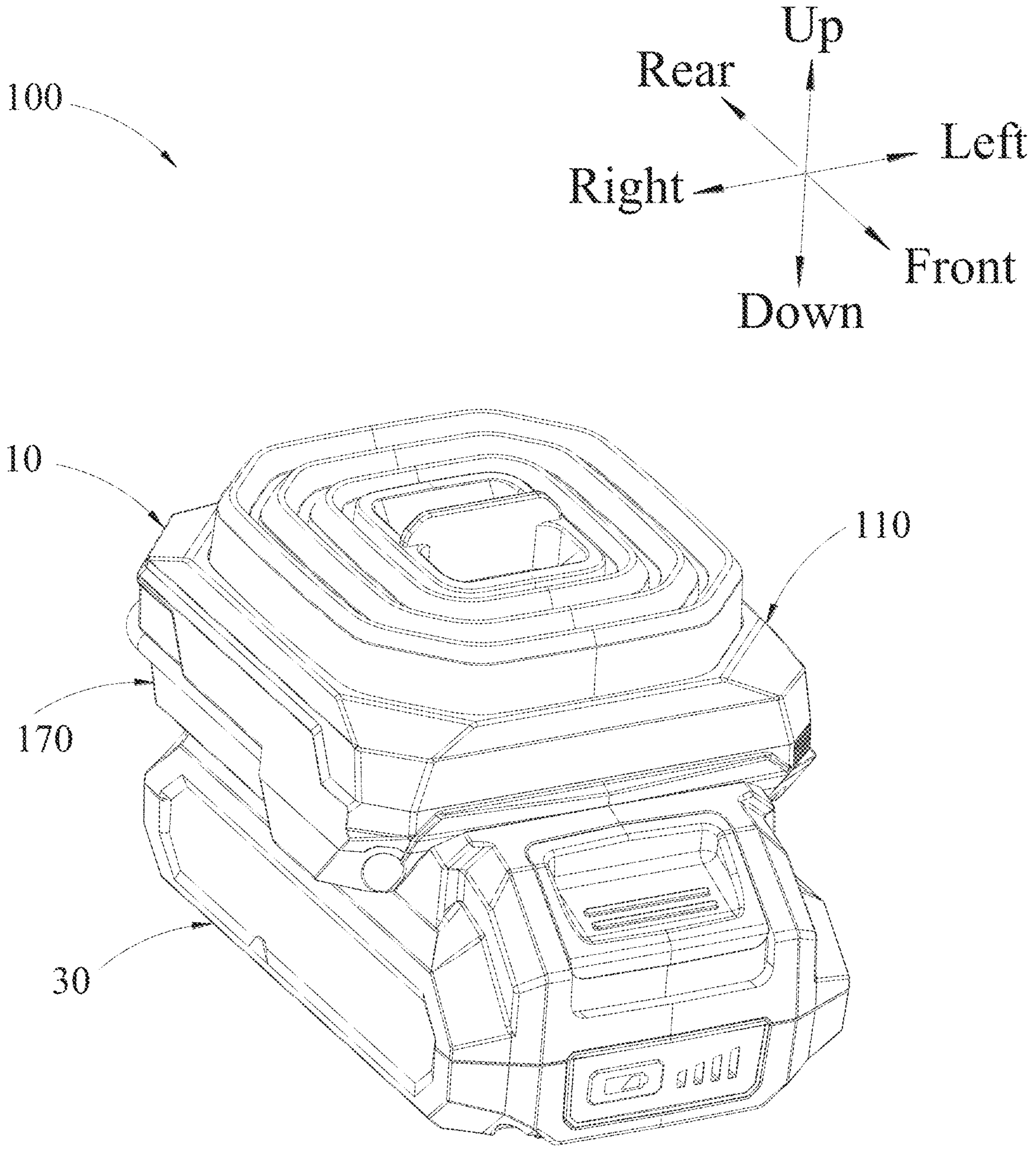
FIG. 1 is a structural view of an example of the present application, where a light housing is in a first state.

Before any examples of this application are explained in detail, it is to be understood that this application is not limited to its application to the structural details and the arrangement of components set forth in the following description or illustrated in the above drawings.

In this application, the terms "comprising", "including", "having" or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase "comprising a . . . " does not preclude the presence of additional identical elements in the process, method, article, or device comprising that element.

In this application, the term "and/or" is a kind of association relationship describing the relationship between associated objects, which means that there can be three kinds of relationships. For example, A and/or B can indicate that A exists alone, A and B exist simultaneously, and B exists alone. In addition, the character "/" in this application generally indicates that the contextual associated objects belong to an "and/or" relationship.

In this application, the terms "connection", "combination", "coupling" and "installation" may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings.

In this application, it is to be understood by those skilled in the art that a relative term (such as "about", "approximately", and "substantially") used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

To clearly describe technical solutions of the present application, an upper side, a lower side, a left side, a right side, a front side, and a rear side are also defined, as shown in FIG. 1.

As shown in FIG. 1, the present application provides a lighting device 100, where the lighting device 100 is a portable worklight that is convenient to carry. When a user needs to work outdoors or on a construction site, the user may carry the lighting device 100 to the outdoors or the construction site to satisfy the illumination requirement. The lighting device 100 in this example is different from a desk lamp or a furniture lighting. The desk lamp is usually placed on a desktop for illumination. The furniture lighting is substantially placed without being moved. Moreover, the desk lamp and the furniture lighting are used in scenes of daily life where the environment is clean and the possibility of collision and pressing is small. In general, during use, the lighting device 100 of the present application is moved frequently and placed or suspended in an outdoor or dusty work region for illumination. Therefore, the lighting device 100 may also be referred to as a work lighting.

The lighting device 100 includes a direct current power supply 30. The direct current power supply 30 is detachably connected to a body 10 of the lighting device 100 to supply power to the body 10 of the lighting device 100. In this example, the direct current power supply 30 is a battery pack, and the battery pack collaborates with a corresponding power supply circuit to supply power to the body 10 of the lighting device 100. In the subsequent description, the battery pack 30 is used instead of the direct current power supply and is not to limit the present invention.

The lighting device 100 may be powered by the battery pack 30 so that even when the user works outdoors and no mains electricity is available around, the lighting device 100 can be powered by the battery pack 30 and thus is convenient to use. Therefore, the lighting device 100 is different from an existing lamp that can be powered only by an alternating current. The lighting device 100 may also be referred to as a direct current lighting device. Of course, it is to be understood that a power supply of the lighting device 100 is not limited to the battery pack 30. If the lighting device 100 can be powered by not only the battery pack 30 but also the alternating current, the lighting device 100 may also be referred to as the direct current lighting device 100.

In this example, the battery pack 30 is a universal battery pack for power tools. That is to say, the battery pack 30 can be coupled to a power tool to power the power tool after being detached. Optionally, the battery pack 30 is also adapted to the power tool such as an electric drill, a screwdriver, a cutting tool, a sanding tool, an outdoor garden tool, or a smart outdoor tool. Optionally, the battery pack 30 is adapted to a charging device for the power tool, where the charging device is, for example, a charger, a charging station, or a bidirectional inverter. When the power stored in the battery pack 30 is insufficient, the battery pack 30 is charged using the charging device for the power tool.

In this example, as shown in FIGS. 1 to 4 and 10, the lighting device 100 includes the body 10 of the lighting device and the battery pack 30, where the battery pack 30 is detachably connected to the body 10 of the lighting device. The body 10 of the lighting device includes a light housing 110 and a light source 150. The light housing 110 forms an accommodation space 120, and the light source 150 is disposed at least partially in the light housing 110. The light source 150 is configured to emit light to illuminate a work space.

Figure 2:
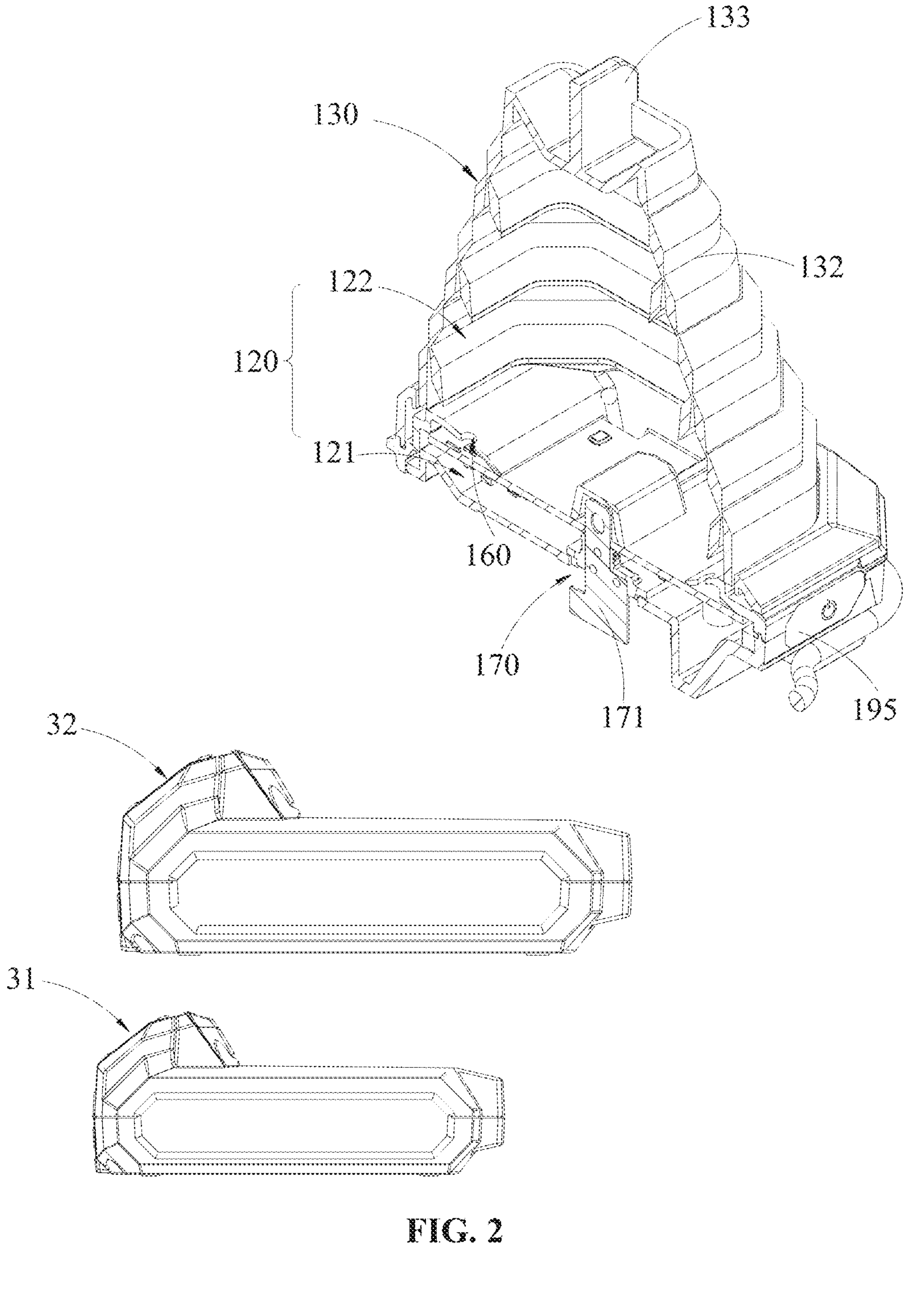
FIG. 2 is a sectional view of an example of the present application from another angle, where a light housing is in a second state.

As shown in FIG. 2, the body 10 of the lighting device can be adapted to at least a first battery pack 31 with a first nominal voltage and a second battery pack 32 with a second nominal voltage. The first nominal voltage is different from the second nominal voltage. In some examples, the body 10 of the lighting device further includes a battery pack receiving portion 170 for detachably connecting the battery pack 30. The battery pack receiving portion 170 is formed on or connected to the light housing 110. The battery pack receiving portion 170 is provided with a first port 171 connected to the battery pack. The structure of the first port 171 is substantially the same as that of a coupling portion of the power tool adapted to the battery pack, which is configured to couple the battery pack, so that the battery pack 30 can be coupled to the power tool to power the power tool after being detached from the body 10 of the lighting device.

Figure 6:
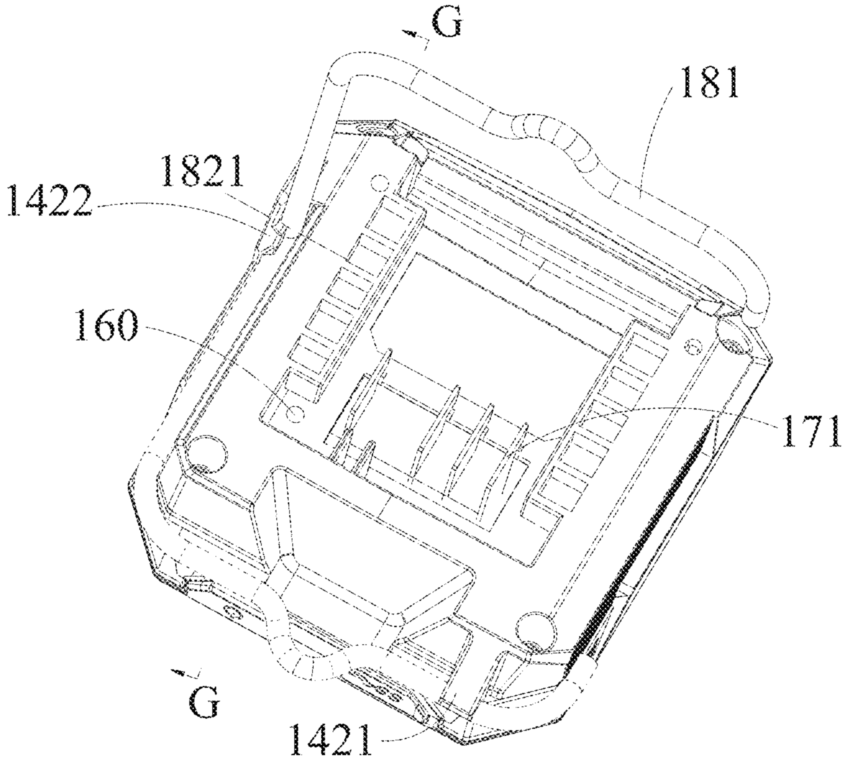
FIG. 6 is a structural view illustrating that an example of the present application is in a suspended state from another angle, where a battery pack is removed.
Figure 7:
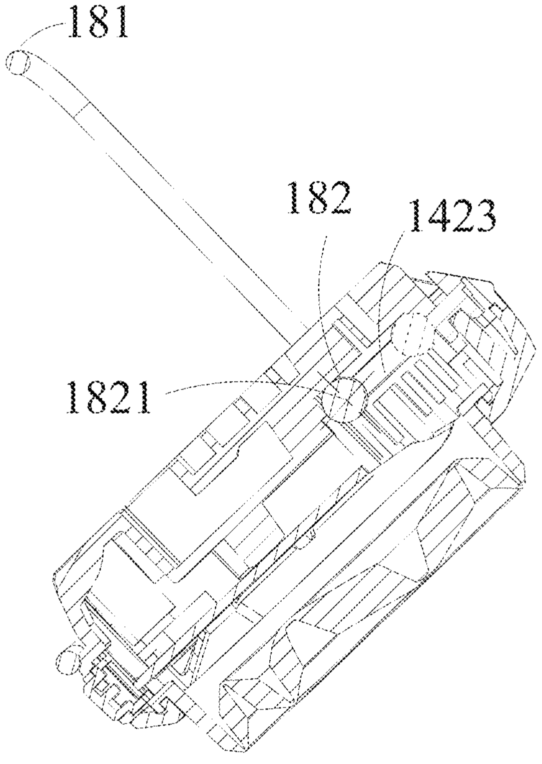
FIG. 7 is a sectional view of FIG. 6 along G-G.

As shown in FIGS. 2 and 6, the first port 171 is adapted to the first battery pack 31 with the first nominal voltage and the second battery pack 32 with the second nominal voltage, where the first nominal voltage is different from the second nominal voltage. The first port 171 is configured to be a first input terminal 1711, and the first input terminal 1711 is selectively electrically connected to a first output terminal of the first battery pack 31 and a second output terminal of the second battery pack 32.

In the present application, the body 10 of the lighting device is provided with the first input terminal 1711 with versatility to be compatible with battery packs 30 of different specifications with different output terminals. The specifications of the battery packs 30 are identified according to different output terminal sets. The lighting device is compatible with battery packs 30 of different dimensions and battery packs with different nominal voltages. The body 10 of the lighting device can be compatible with the battery packs 30 of different specifications. In some examples, different insertion portions are provided on the first input terminal so that the battery packs 30 of different dimensions can be stably connected to the body 10 of the lighting device.

It is to be understood that the battery pack 30 may be a lithium battery pack, a solid-state battery pack, or a pouch battery pack. The first battery pack 31 and the second battery pack 32 are an example in this example. The number of battery packs 30 to which the body 10 of the lighting device can be adapted is not limited in the present application, that is to say, the body 10 of the lighting device can be adapted to two or more types of battery packs 30. In this example, the nominal voltage of the first battery pack 31 is greater than or equal to 10.8 V, and the nominal voltage of the second battery pack 32 is greater than or equal to 10.8 V. It is to be interpreted that the nominal voltage generally refers to a voltage specified by the manufacturer or the vendor on the label, packaging, user manual, specification, advertisement, marketing document, or another support document of the battery pack so that the user knows which power tools can run with the battery pack. Alternatively, the nominal voltage of the battery pack may be acquired by being detected or calculated. The battery pack 30 includes cell units. The voltage of a single cell unit is generally between 3.6 V and 4.2 V. For example, the battery pack 30 includes three cell units, the voltage of each cell unit is basically 3.6 V, and the three cell units are connected in series; therefore, the nominal voltage of the battery pack may be considered 10.8 V. In some examples, the nominal voltage of the first battery pack 31 is 10.8 V, 12 V, 20 V, 24 V, 36 V, 48 V, 56 V, or 80 V. The nominal voltage of the second battery pack 32 is 10.8 V, 12 V, 20 V, 24 V, 36 V, 48 V, 56 V, or 80 V and different from the nominal voltage of the first battery pack 31.

Figure 3:
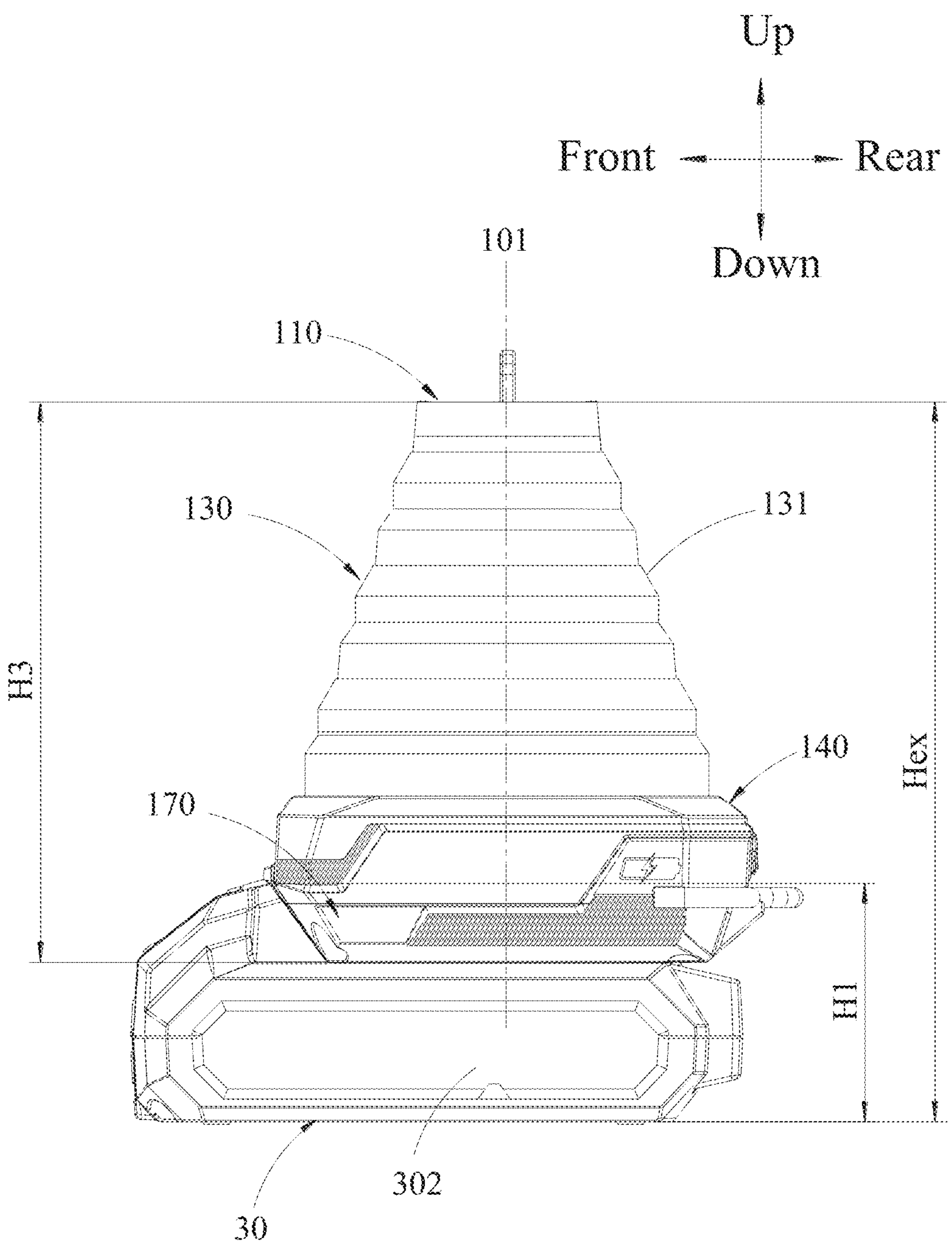
FIG. 3 is a structural view of an example of the present application from another angle, where a light housing is in a second state.
Figure 4:
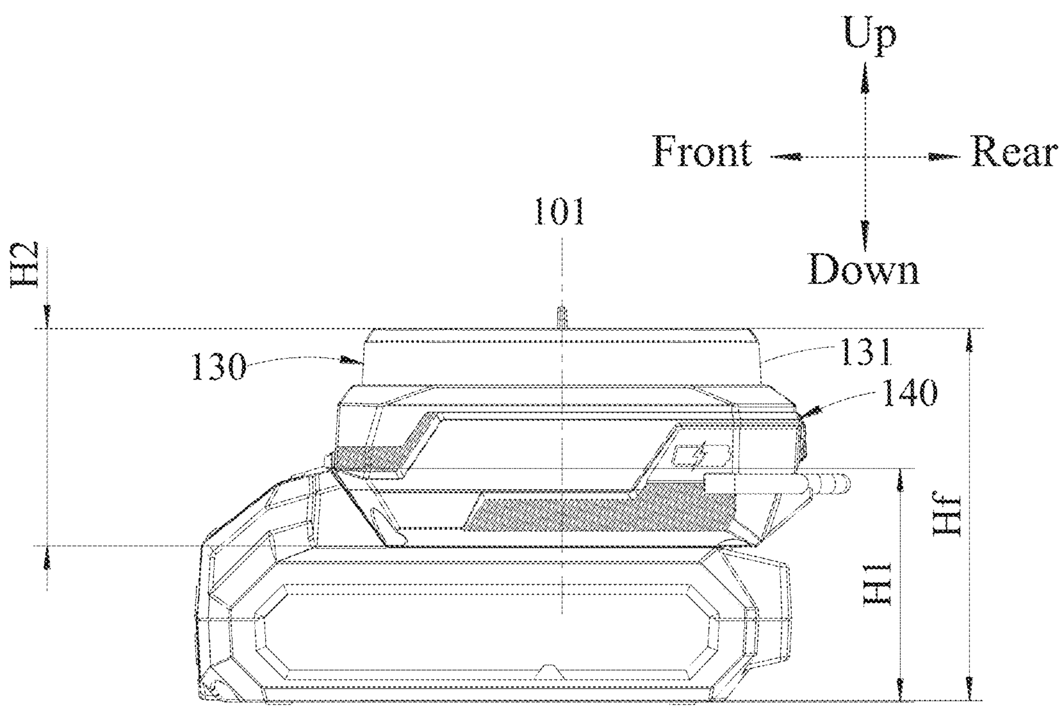
FIG. 4 is a structural view of an example of the present application from another angle, where a light housing is in a first state.

In this example, a battery pack with a nominal voltage of 10.8 V among different nominal voltages is used as an example. As shown in FIGS. 3 and 4, the battery pack 30 has a height dimension H1 defined, where H1 is a maximum dimension of a housing of the battery pack 30 along a height direction. For example, the height dimension of the battery pack 30 includes a structural part of the battery pack 30 locked to the body 10 of the lighting device. In this example, the height direction of the battery pack 30 is perpendicular to a direction in which the battery pack 30 is connected to the body 10 of the lighting device.

As shown in FIGS. 3 and 4, the light housing 110 includes a first state with a height dimension H2 (as shown in FIG. 4) and a second state with a height dimension H3 (as shown in FIG. 3) along a height direction of the light housing 110. The height dimension H2 in the first state is less than the height dimension H3 in the second state. The height direction of the battery pack 30 is parallel to the height direction of the light housing 110. Optionally, the height direction of the battery pack 30 is the same as the height direction of the light housing 110, and the height direction of the battery pack 30 and the height direction of the light housing 110 are an up and down direction. The height direction of the battery pack 30, the height direction of the light housing 110, and a height direction of the lighting device 100 are the up and down direction. In this example, the first state is a folded state of the lighting device 100, and the second state is an extended state of the lighting device 100. In this example, the battery pack receiving portion 170 is formed on the light housing 110. Optionally, the battery pack receiving portion 170 is undetachably connected to the light housing 110, that is to say, the user cannot separate the battery pack receiving portion 170 from the light housing 110 during use. Alternatively, even when the lighting device 100 is not in operation, the battery pack receiving portion 170 cannot be detached together with the battery pack 30. In this example, the dimension of the light housing 110 includes that of the battery pack receiving portion 170. In this case, the height dimension of the light housing 110 includes a portion of the battery pack receiving portion 170. In some alternative examples, the battery pack receiving portion 170 is detachably connected to the light housing 110, that is to say, the battery pack receiving portion 170 is an independent component structure, and the user can detach the battery pack receiving portion 170 without damaging any component or without a risk of damaging any component. Alternatively, a user manual or a specification indicates that the lighting device has a scenario where the battery pack receiving portion 170 is detached. In this case, the dimension of the light housing 110 does not include that of the battery pack receiving portion 170, and the dimension of the light housing 110 is a dimension after the battery pack receiving portion 170 is detached. The height dimension of the light housing 110 does not include that of the battery pack receiving portion 170. In some alternative examples, in addition to the battery pack receiving portion 170, another structural component is further provided on the light housing 110. Similar to the case of the battery pack receiving portion 170, whether the dimension of the light housing 110 includes that of another structural component is determined according to whether the structural component can be detached from the light housing.

In this example, the height dimension H2 of the light housing 110 in the first state is less than or equal to the height dimension H1 of the battery pack 30. In some examples, the ratio of the height dimension H2 of the light housing 110 in the first state to the height dimension H1 of the battery pack 30 is less than or equal to 0.95.

In this example, the height dimension H3 of the light housing 110 in the second state is greater than the height dimension H1 of the battery pack 30. In some examples, the ratio of the height dimension H3 of the light housing 110 in the second state to the height dimension H1 of the battery pack 30 is greater than or equal to 1.2. In some examples, the ratio of the height dimension H3 of the light housing 110 in the second state to the height dimension H1 of the battery pack 30 is greater than or equal to 1.4. In some examples, the ratio of the height dimension H3 of the light housing 110 in the second state to the height dimension H1 of the battery pack 30 is greater than or equal to 1.5. In some examples, the ratio of the height dimension H3 of the light housing 110 in the second state to the height dimension H1 of the battery pack 30 is greater than or equal to 1.8. In some examples, the ratio of the height dimension H3 of the light housing 110 in the second state to the height dimension H1 of the battery pack 30 is greater than or equal to 2. In some examples, the ratio of the height dimension H3 of the light housing 110 in the second state to the height dimension H1 of the battery pack 30 is greater than or equal to 2.2. In some examples, the ratio of the height dimension H3 of the light housing 110 in the second state to the height dimension H1 of the battery pack 30 is greater than or equal to 2.2. In some examples, the ratio of the height dimension H3 of the light housing 110 in the second state to the height dimension H1 of the battery pack 30 is greater than or equal to 2.4. In some examples, the ratio of the height dimension H3 of the light housing 110 in the second state to the height dimension H1 of the battery pack 30 is greater than or equal to 2.6. In some examples, the ratio of the height dimension H3 of the light housing 110 in the second state to the height dimension H1 of the battery pack 30 is greater than or equal to 2.8. In some examples, the ratio of the height dimension H3 of the light housing 110 in the second state to the height dimension H1 of the battery pack 30 is greater than or equal to 3. In some examples, the ratio of the height dimension H3 of the light housing 110 in the second state to the height dimension H1 of the battery pack 30 is greater than or equal to 3.2.

In this example, the dimension of the light housing 110 in the height direction changes such that the dimension of the light housing 110 in the first state, that is, the folded state, is substantially equal to the height of the battery pack 30 or even less than the height of the battery pack 30. Thus, the lighting device 100 has a sufficiently small height dimension and is convenient to carry and transport. It is to be understood that for the lighting device 100 using the direct current power supply, the dimension of the battery pack 30 is a standard dimension. Therefore, to make the lighting device 100 more compact in dimension and more convenient for the user to carry, the dimension of the light housing 110 is required to be as small as possible to be less than or equal to the dimension of the battery pack 30. In some examples, the battery pack 30, the battery pack receiving portion 170, and the light housing 110 define a height dimension of the lighting device 100, and when the light housing 110 is in the first state, the ratio of a height dimension Hf of the lighting device 100 to the height H1 of the battery pack 30 is less than 2.5. In some examples, when the light housing 110 is in the first state, the ratio of the height dimension Hf of the lighting device 100 to the height H1 of the battery pack 30 is less than 2.3. In some examples, when the light housing 110 is in the first state, the ratio of the height dimension Hf of the lighting device 100 to the height H1 of the battery pack 30 is less than 2. In some examples, the ratio of the height dimension Hf of the lighting device 100 to the height H1 of the battery pack 30 is less than or equal to 1.8. In some examples, the ratio of the height dimension Hf of the lighting device 100 to the height H1 of the battery pack 30 is less than or equal to 1.6. In this example, the height dimension of the lighting device 100 is not greater than twice the height of the battery pack 30. Carrying the lighting device 100 is basically equivalent to carrying one battery pack 30. A sufficiently small dimension of the lighting device 100 makes it possible for the lighting device 100 to carry.

In this example, the dimension of the light housing 110 in the height direction changes such that the dimension of the light housing 110 in the first state, that is, the folded state, is small enough and the dimension of the light housing 110 in the second state, that is, the extended state, is large enough. In this example, the length of the light housing 110 in the second state of the light housing 110 is increased by 0.3 times H2 relative to the length of the light housing 110 in the first state, which may be understood as that the ratio of the height dimension H3 in the second state to the height dimension H2 in the first state is greater than or equal to 1.3. The lighting device 100 unfolded to be larger in dimension has a better lighting effect and is more conducive to the work of the user during illumination. In some examples, the battery pack 30, the battery pack receiving portion 170, and the light housing 110 define the height dimension of the lighting device 100, and when the light housing 110 is in the second state, the ratio of a height dimension Hex of the lighting device 100 to the height H1 of the battery pack 30 is greater than or equal to 2. In some examples, when the light housing 110 is in the second state, the ratio of the height dimension Hex of the lighting device 100 to the height H1 of the battery pack 30 is greater than or equal to 2.3. In some examples, when the light housing 110 is in the second state, the ratio of the height dimension Hex of the lighting device 100 to the height H1 of the battery pack 30 is greater than or equal to 2.5. In some examples, when the light housing 110 is in the second state, the ratio of the height dimension Hex of the lighting device 100 to the height H1 of the battery pack 30 is greater than or equal to 2.8. In some examples, when the light housing 110 is in the second state, the ratio of the height dimension Hex of the lighting device 100 to the height H1 of the battery pack 30 is greater than or equal to 3.

In this example, when the lighting device is placed, the battery pack 30 supports the body 10 of the lighting device. Optionally, the battery pack 30 supports the lighting device 100. In some examples, the battery pack 30 includes at least one support surface, such as a first support surface. The first support surface allows the body 10 of the lighting device to be set and maintained at a vertical standing position on a work surface (such as a horizontal work surface (for example, a desk, a workbench, or the ground)). The first support surface is disposed on the housing of the battery pack. In some examples, the first support surface faces away from a surface of the battery pack 30 coupled to the battery pack receiving portion 170. When the lighting device 100 is at the vertical standing position, the user may adjust the first state and the second state of the light housing 110. In some examples, the first support surface is perpendicular to the height direction of the light housing 110.

As shown in FIGS. 1 to 4, the light housing 110 defines a central axis 101, and the central axis 101 is parallel to the height direction, that is to say, the central axis 101 extends along the height direction. The central axis 101 is defined as follows: when an orthographic projection of the light housing 110 in the height direction is a circle, the central axis 101 passes through the center of the circle. When the orthographic projection of the light housing 110 in the height direction is a polygon, the central axis 101 passes through the geometric center of the polygon. In this example, the light housing 110 extends and retracts along a direction of the central axis 101 and changes in length. The light housing 110 is at least partially made of a flexible material. In some examples, the light housing 110 includes a flexible housing 130, a mounting portion 140, and a light-transmissive portion. In this example, the flexible housing 130 is partially made of a light-transmissive material. Therefore, at least part of the flexible housing 130 is the light-transmissive portion. In this example, the light-transmissive portion extends by 360° around the central axis so that the light emitted by the light source 150 can extend by 360° around the central axis. In this example, the flexible housing 130 is made of a semi-transparent but light-transmissive material or a non-transparent but light-transmissive material.

Figure 5:
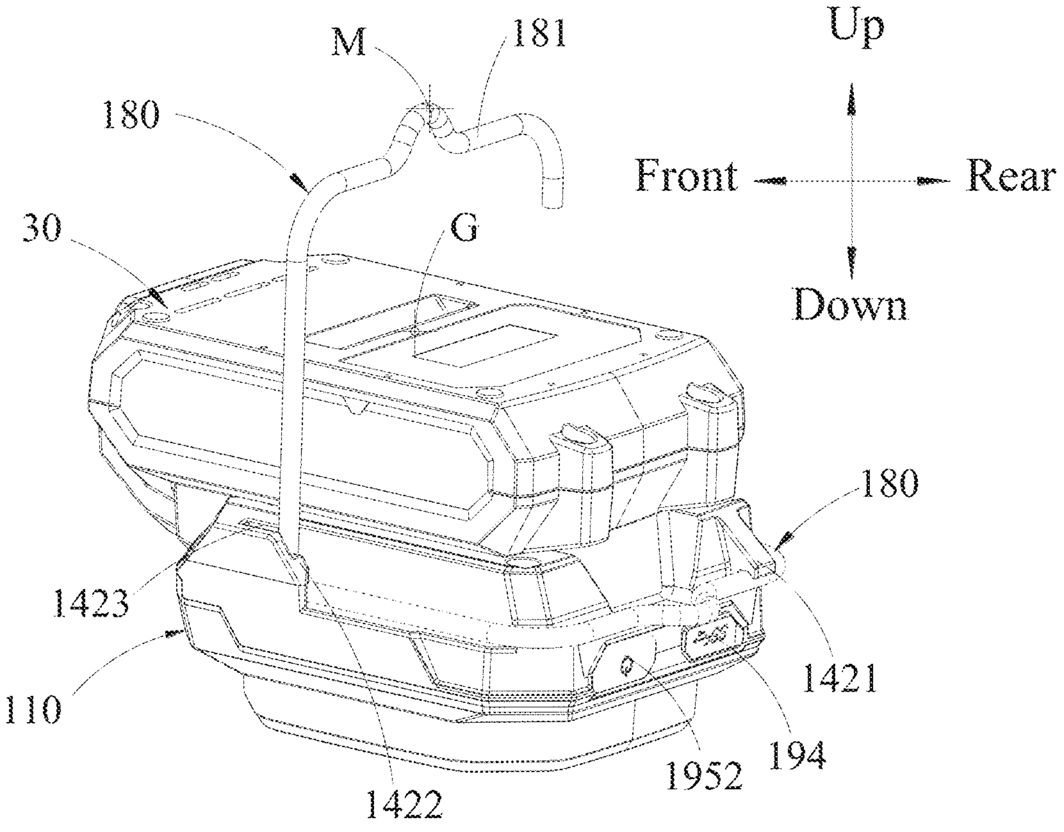
FIG. 5 is a structural view illustrating that an example of the present application is in a suspended state, where a light housing is in a first state.

As shown in FIGS. 1 to 4, 9, and 10, the mounting portion 140 supports the flexible housing 130. In this example, the flexible housing 130 is mounted on the mounting portion 140. The flexible housing 130 extends and retracts along the direction of the central axis 101 and changes in length. The flexible housing 130 deforms to remain in the first state or the second state. In this example, the flexible housing 130 includes flexible portions 131, and the flexible portions 131 are arranged in multiple layers so that the light housing 110 is small enough in the first state and large enough in the second state. In some examples, the flexible housing 130 is not entirely a flexible structure. Optionally, the flexible housing 130 is partially made of a rigid material to maintain the housing shape. In some examples, the flexible housing 130 is entirely made of a flexible material so that the whole flexible housing 130 can deform. Along a radial direction of the flexible housing 130, the flexible portions 131 decrease in dimension layer by layer. When the light housing 110 is in the second state, the flexible portions 131 decrease in dimension layer by layer in a direction from the proximity of the battery pack 30 to away from the battery pack 30. For example, from bottom to top in the height direction, the flexible portions 131 decrease in the outer circumference dimension layer by layer. As shown in FIGS. 2 and 3, when the light housing 110 is in the second state, the light housing 110 is basically in the shape of a cone, a frustum, or a truncated cone in appearance. As shown in FIGS. 1, 5, and 6, when the light housing 110 is in the first state, that is, when the light housing 110 is folded, the flexible housing 130 is basically plate-shaped in appearance. In this case, flexible portions 131 of the flexible housing 130 are sequentially received in a flexible portion 131 on the lower side thereof until they are received in a flexible portion 131 in the lowest layer. Different from that rotating around a spindle to be folded in the related art, the flexible housing 130 of the present application is not provided with a spindle and is folded into deformation using the flexibility of walls of the light housing 110 so that the flexible housing 130 is folded for storage and extended layer by layer along the direction of the central axis 101. However, the light-transmissive portion extending by 360° around the central axis 101 on the light housing 110 only changes in axial length. It is ensured that the light emitted by the light source 150 can always extend by 360° around the central axis 101. Moreover, when completely folded to the first state, the flexible housing 130 is stored in the flexible portion 131 in the bottom layer, reducing the volume of a lamp body and facilitating storage and carrying.

In this example, along the height direction or the up and down direction, an orthographic projection of the light housing 110 in the second state has the same area as an orthographic projection of the light housing 110 in the first state. Along the height direction or the up and down direction, the orthographic projection of the light housing 110 in the second state has the same outer contour as the orthographic projection of the light housing 110 in the first state. In this example, folds 132 are distributed on the light housing 110. In some examples, the folds 132 are disposed along a circumferential direction of the flexible housing 130, and the folds 132 are arranged along the axial direction. In this example, the flexible housing 130 is made of silicone or rubber. The flexible housing 130 of the light housing 110 is entirely folded or partially folded, and the user can customize the number of layers of flexible portions 131 folded according to a use requirement so that the light housing 110 can provide different use shapes. In this example, the light housing 110 further includes a lifting portion 133 disposed on the upper side of the flexible housing 130 along the height direction and configured to extend the flexible housing 130 along the height direction. The lifting portion is convenient for the user to operate.

Figure 9:
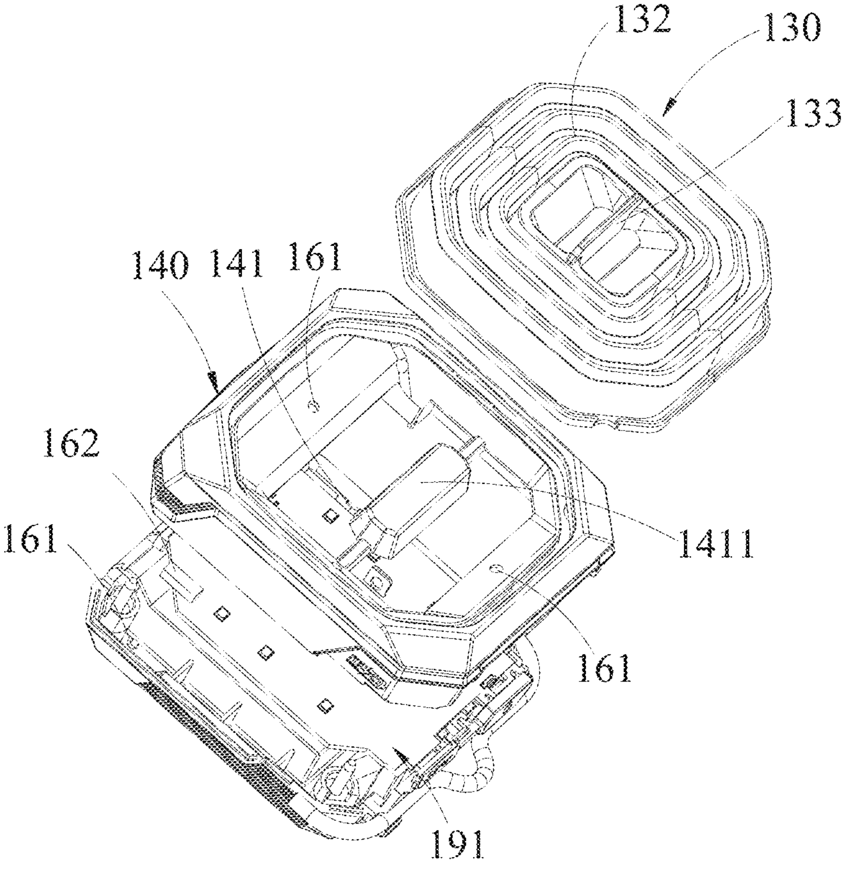
FIG. 9 is an exploded view of an example of the present application.

As shown in FIGS. 2, 6, and 9, the accommodation space 120 formed by the light housing 110 includes a first accommodation portion 121 consistent in volume in the first state and the second state and a second accommodation portion 122 changing in volume in the first state and the second state. For example, the second accommodation portion 122 is an accommodation space formed by the flexible housing 130. The first accommodation portion 121 is a portion of the accommodation space formed by the light housing 110 other than the second accommodation portion 122. The lighting device 100 further includes an air pressure balancing portion 160 to keep air pressure in the second accommodation portion 122 basically unchanged. When the light housing 110 switches between the first state and the second state, the second accommodation portion 122 changes in volume as the axial length of the flexible housing 130 changes. When the volume changes, if no gas enters or flows out as the volume changes, the air pressure in the second accommodation portion 122 also changes accordingly. Then, based on the atmospheric pressure, when the light housing 110 switches between the first state and the second state, the air pressure inside the flexible housing 130 or the light housing 110 is unbalanced with the atmospheric pressure, resulting in the non-preset deformation of the light housing 110 or a failure of the light housing 110 to be folded or extended. The air pressure balancing portion 160 in the present application is configured to balance the air pressure in the second accommodation portion 122 during the switching between the first state and the second state. In some examples, the air pressure balancing portion 160 includes air holes 161 for making the inside of the second accommodation portion 122 communicate with the outside of the second accommodation portion 122. In this example, multiple air holes 161 are provided, and the air holes 161 make the second accommodation portion 122 communicate with the outside. In some examples, the air holes 161 are disposed outside the flexible housing 130. In this example, one end of the mounting portion 140 is connected to the flexible housing 130, and one end of the mounting portion 140 forms or is connected to the battery pack receiving portion 170. The air holes 161 are disposed on the mounting portion 140 of the light housing 110. At least part of the air holes 161 are disposed on the battery pack receiving portion 170 so that the second accommodation portion 122 communicates with the external atmosphere. Optionally, air holes 161 are disposed in a space of the battery pack receiving portion 170 for accommodating the battery pack 30. In this manner, in a flowing process of the air, the air can also help the battery pack 30 dissipate heat. In this example, to prevent external dust and the like from entering the light housing 110, a porous dust pad 162 is provided on each air hole 161. The porous dust pad 162 can allow the air to pass through but prevent the dust from passing through. The porous dust pad 162 includes a sponge.

In some alternative examples, the air pressure balancing portion 160 includes another air circulation structure. For example, the housing is made of an air-permeable material. In some examples, the air pressure balancing portion 160 is a gap generated between the flexible housing 130 and the mounting portion 140 when the flexible housing 130 undergoes non-preset deformation so that the air can circulate.

Figure 10:
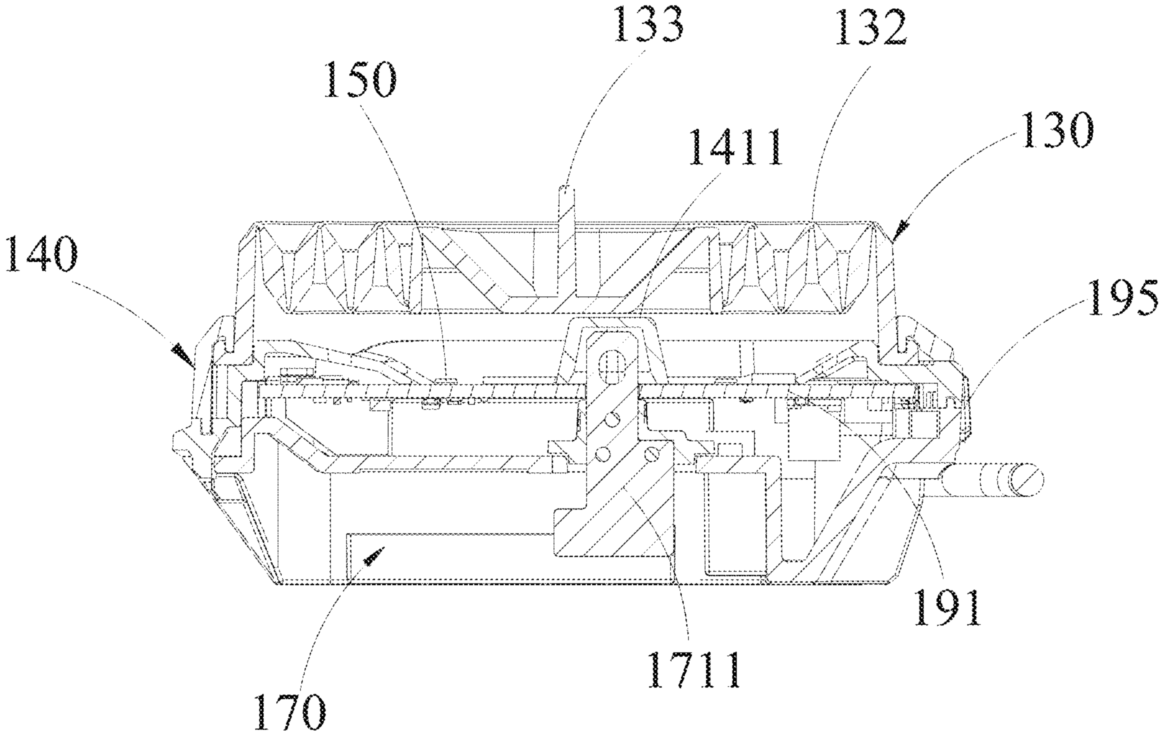
FIG. 10 is a sectional view of FIG. 9.

As shown in FIGS. 9 and 10, the mounting portion 140 further includes a support portion 141, and a support surface 1411 of the support portion 141 is located above the light source 150. When the light housing 110 is in the first state, the support portion 141 keeps the light housing 110 above the light source 150. When the light housing 110 is accidentally pressed, the light source 150 is prevented from being damaged due to the deformation of the light housing 110.

As shown in FIGS. 5 to 8, a hook 180 is provided on the mounting portion 140, the hook 180 includes an unfolded state (a state indicated by solid lines) in which the hook 180 is away from the mounting portion 140, and the hook 180 in the unfolded state keeps the lighting device 100 suspended with the battery pack 30 facing upward. For example, the hook 180 keeps the lighting device 100 suspended in a vertical direction and with the light source 150 below the battery pack 30. The hook 180 also includes a stored state (a state indicated by dashed lines) in which the hook 180 is close to the mounting portion 140. In the stored state, at least part of the hook 180 is received on the outer circumference of the mounting portion 140.

Figure 8:
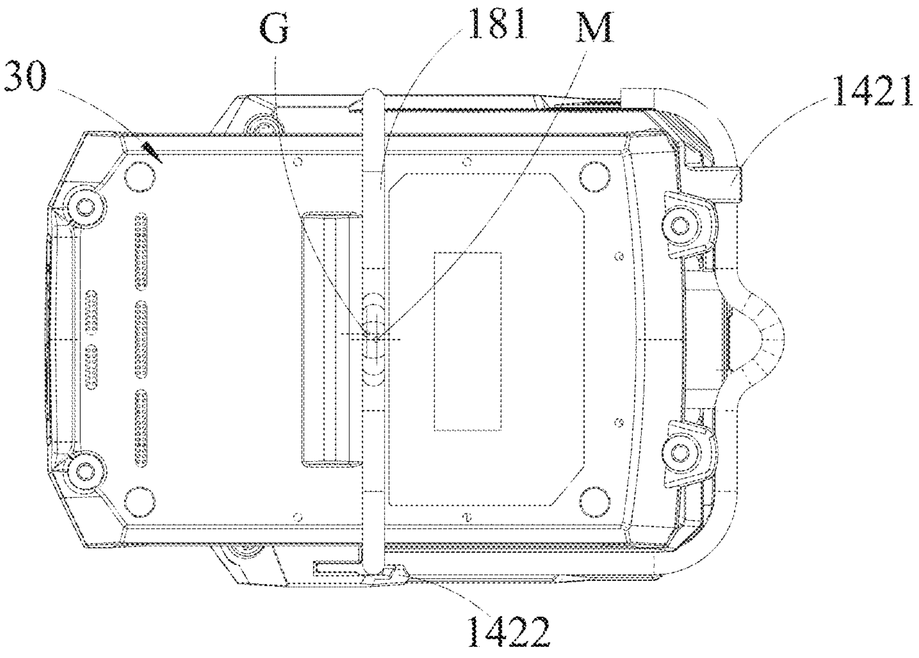
FIG. 8 is a structural view illustrating that an example of the present application is in a suspended state from another angle.

In this example, the mounting portion 140 is provided with locking portions configured to keep the hook 180 in the stored state and the unfolded state. The hook 180 includes a hanging body 181 and a limiting portion 182. The locking portions include a first locking portion 1421 configured to keep the hook 180 in the stored state. For example, the first locking portion 1421 is connected to the hanging body 181, and the first locking portion 1421 prevents a displacement of the hanging body 181. Optionally, the first locking portion 1421 includes a snap, an engaging groove, a clasp, or a clamping structure and locks or clamps the hanging body 181 through a mechanical structure to prevent the displacement of the hanging body 181. Optionally, the first locking portion 1421 includes an adsorption device such as magnetic attraction or adhesion. The locking portions include a second locking portion 1422 configured to keep the hook 180 in the unfolded state. The hook 180 switches between the stored state and the unfolded state through translation and rotation. The mounting portion 140 further includes a translation channel 1423 with a certain length. The limiting portion 182 slides in the translation channel 1423 and rotates around a centerline 1821 of the limiting portion 182 so that the hook 180 is disengaged from the first locking portion 1421 and then enters the second locking portion 1422, or the hook 180 is disengaged from the second locking portion 1422 and then enters the first locking portion 1421. In this example, the second locking portion 1422 is disposed at an end of the translation channel 1423. For example, the second locking portion 1422 is connected to the hanging body 181, and the second locking portion 1422 prevents a displacement and rotation of the hanging body 181. Optionally, the second locking portion 1422 includes a snap, an engaging groove, a clasp, or a clamping structure and locks or clamps the hanging body 181 through a mechanical structure to prevent the displacement of the hanging body 181. Optionally, the second locking portion 1422 includes an adsorption device such as magnetic attraction or adhesion. In this example, when the hook 180 is in the unfolded state, the hanging body 181 is hook-shaped, U-shaped, or C-shaped. The hanging body 181 includes a load-bearing portion that bears the gravity of the lighting device and a connecting portion for connection. The midpoint M of the hanging body 181 is set at the center of the load-bearing portion. In the up and down direction, the midpoint M of the hanging body 181 is located above the center of gravity G of the lighting device 100. As shown in FIG. 8, in the up and down direction, an orthographic projection of the midpoint M of the hanging body 181 is close to an orthographic projection of the center of gravity G of the lighting device 100. In the up and down direction, the projection of the midpoint M of the hanging body 181 basically coincides with the projection of the center of gravity G of the lighting device 100. Thus, the lighting device 100 is kept suspended vertically and stably.

Figure 11:
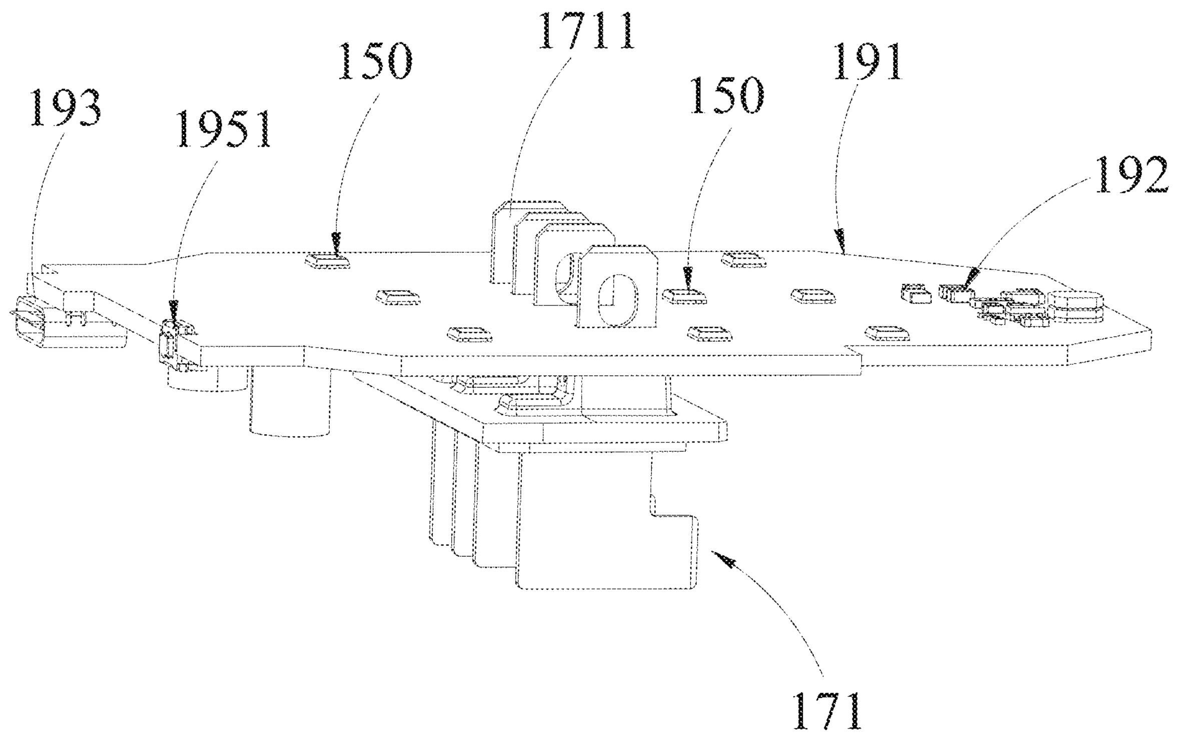
FIG. 11 is a structural view of a control circuit board.

As shown in FIGS. 9 to 11, the light source 150 includes one or more LEDs. The light source 150 may be LED light beads. In other examples, an additional or alternative light source 150 may be included, such as chip-on-board (COB) light beads. In some examples, the light source 150 produces light with a brightness of 300 lumens or higher.

Optionally, the light source 150 may operate in different modes such as a bright mode and a power saving mode. In some examples, the light source 150 can produce light with a brightness of 300 lumens or higher in the bright mode and produce light with a brightness of 50 lumens or lower in the power saving mode. In some examples, the light source 150 can produce light with a brightness of 450 lumens in the bright mode and produce light with a brightness of 75 lumens in the power saving mode. In other examples, the light source 150 may operate in more different modes, such as different color temperatures or different work modes such as flashing or breathing. In this example, the battery pack 30 has a capacity of 4.0 ampere hours (Ah). The battery can power the light source 150 in the bright mode for at least 16 hours and power the light source 150 in the power saving mode for at least 75 hours. In some examples, the battery can power the light source 150 in the bright mode for 5 to 8 hours and power the light source 150 in the power saving mode for 10 to 16 hours. In further examples, depending on the capacity of the battery pack 30, the light source 150 in either mode can be powered for a longer time. In some examples, the battery pack 30 has a capacity of less than 4.0 Ah. In some examples, the battery can power the light source 150 in the bright mode for 5 to 8 hours and power the light source 150 in the power saving mode for 30 to 40 hours.

In this example, the lighting device 100 further includes a power button 195 for controlling the light source 150 to be lit and extinguished. Optionally, the light source 150 may switch between different modes of operation by using the power button 195 or another switching button. A controller 192 coupled to the light source 150 and configured to control the light source 150 is further included. The controller 192 adopts a dedicated control chip such as a single-chip microcomputer or a microcontroller unit (MCU). The controller 192 adjusts and controls the light source 150 according to an operating instruction. A control circuit board 191 includes a printed circuit board (PCB) and a flexible printed circuit (FPC) board.

In this example, the controller 192, the light source 150, and the first port 171 are separately disposed on the control circuit board 191. The control circuit board 191 is disposed at least partially in the light housing 110. For example, the first port 171 includes the first input terminal 1711, and the first input terminal 1711 is inserted into the control circuit board 191.

Optionally, the first input terminal 1711 is welded to the control circuit board 191. The control circuit board 191 is disposed at least partially in the mounting portion 140. The other end of the first input terminal 1711 extends out of the mounting portion 140 and is connected to the battery pack 30. Part of the heat on the control circuit board 191 can be dissipated through the first input terminal 1711 connected to the control circuit board 191. In some examples, the lighting device 100 uses the first input terminal 1711 for heat dissipation, thereby reducing a structure for heat dissipation of the light source 150. In this example, the first input terminal 1711 is connected in a region of the light source 150.

In this example, as shown in FIGS. 5 and 11, the power button 195 is disposed on the control circuit board 191. The power button 195 includes a switch 1951 and an operating member 1952, and the operating member 1952 is disposed on the light housing 110 to be convenient for the user to operate.

In some examples, the controller 192, the light source 150, and the power button 195 are distributed on the control circuit board 191 and do not overlap each other.

In this example, as shown in FIGS. 5 and 9 to 11, the lighting device 100 further includes a charging port 193 and a charging port cover 194. The charging port 193 is disposed on the control circuit board 191. The charging port cover 194 is pivotally connected to the light housing 110. In this example, the charging port 193 is adjacent to the power button 195. Optionally, the charging port 193 and the power button 195 are disposed on the same side surface of the light housing 110. The charging port 193 may supply power to an external device, where the external device includes, for example, an electronic device of the user, including, but not limited to, a mobile phone, a tablet computer, a computer, and a wearable device. When the user needs to charge the mobile phone, the mobile phone is connected to the charging port 193 via a data cable to be charged through the charging port 193. The charging port 193 is specifically one or more of a Universal Serial Bus (USB) interface, a Type-C interface, and a lighting interface. The battery pack 30 on the lighting device 100 may be charged through the charging port 193. Thus, when the lighting device 100 is inconvenient to charge, the battery pack 30 may be charged by using the remaining power of the mobile phone or some other adaptable devices. Alternatively, the charging port 193 is connected to an onboard power supply and the battery pack 30 is charged by the onboard power supply. Alternatively, the lighting device 100 is directly powered through the charging port 193.

Figure 12:
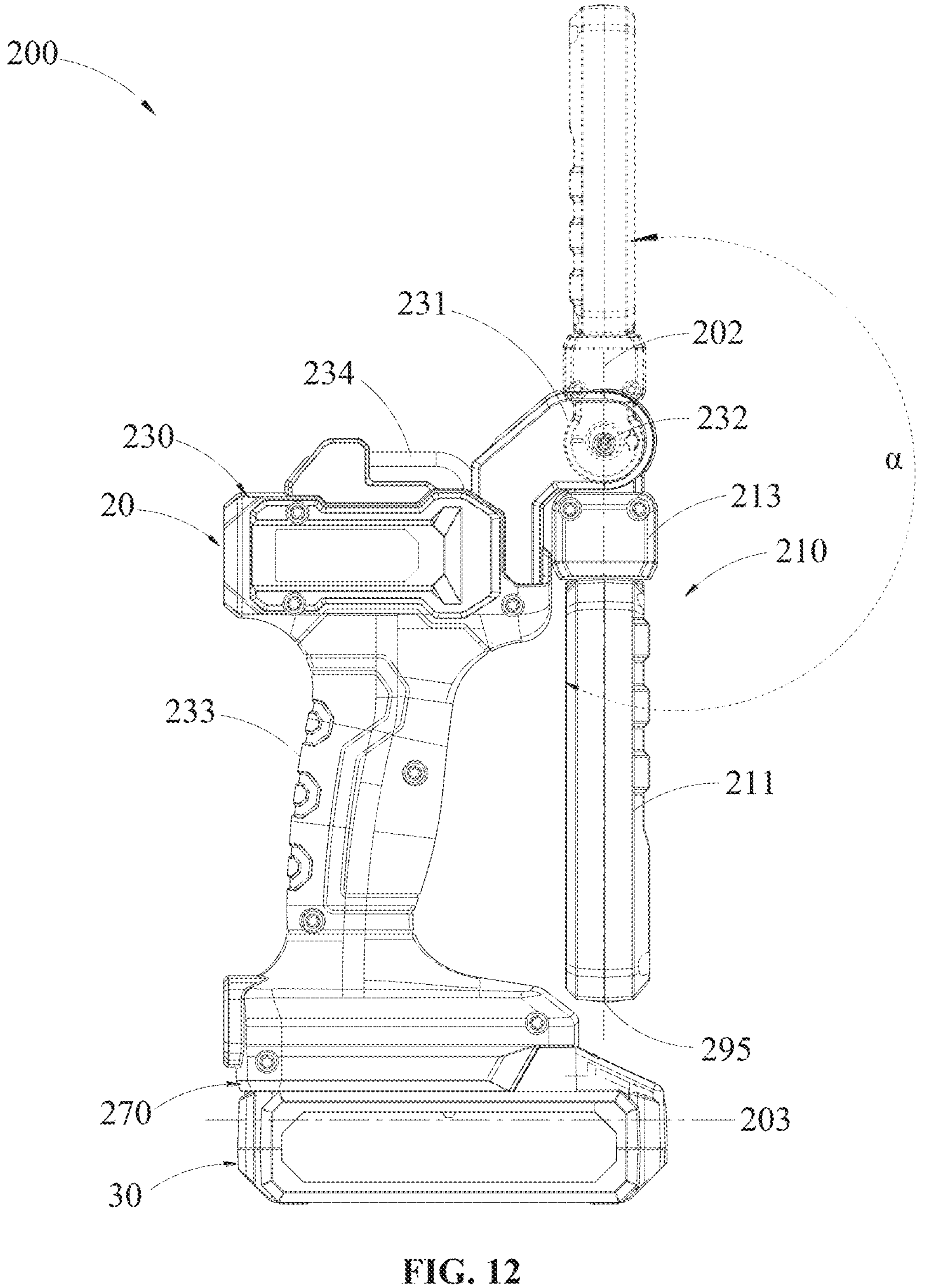
FIG. 12 is a structural view of a second example of the present application.
Figure 13:
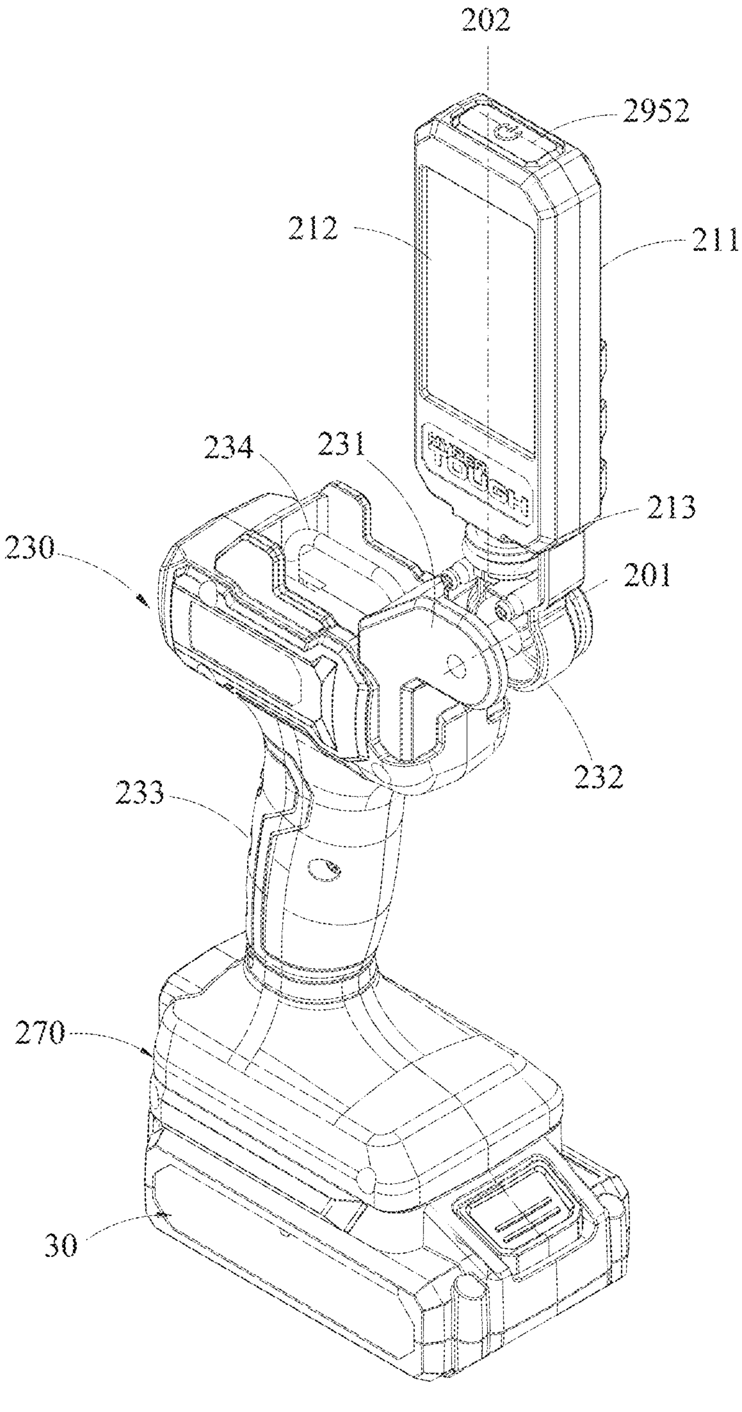
FIG. 13 is a structural view of a second example of the present application from another angle.
Figure 14:
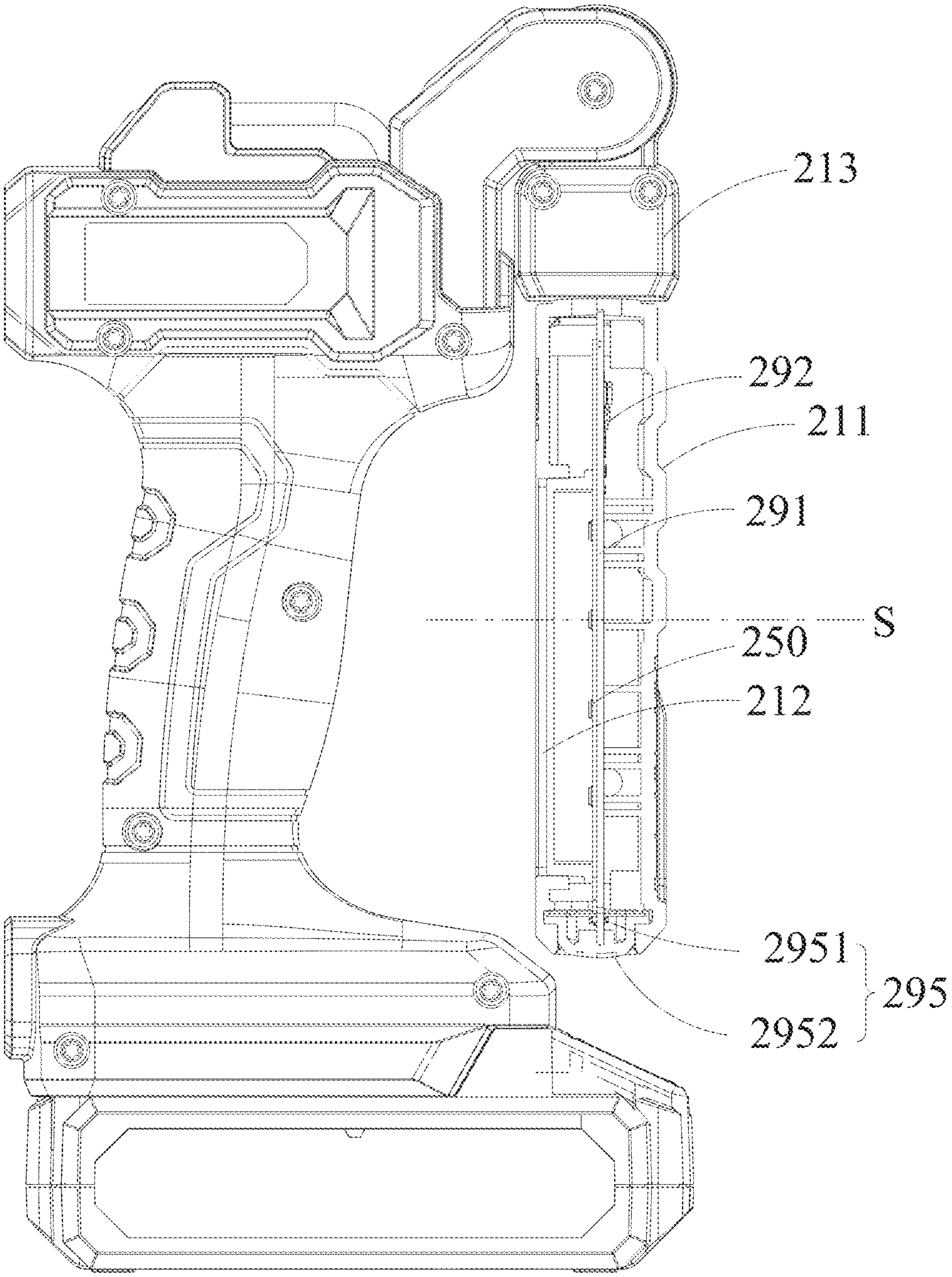
FIG. 14 is a partial sectional view of a second example of the present application.

FIGS. 12 to 14 show another example of the present application. In this example, a lighting device 200 is also a portable worklight that is convenient to carry. When a user needs to work outdoors or on a construction site, the user may carry the lighting device 200 to the outdoors or the construction site to satisfy the illumination requirement. The lighting device 200 in this example is different from a desk lamp or a furniture lighting. The desk lamp is usually placed on a desktop for illumination. The furniture lighting is substantially placed without being moved. Moreover, the desk lamp and the furniture lighting are used in scenes of daily life where the environment is clean and the possibility of collision and pressing is small. In general, during use, the lighting device 200 of the present application is handheld for use or placed or suspended in an outdoor or dusty work region for illumination. Therefore, the lighting device 200 may also be referred to as a work lighting.

The lighting device 200 includes a direct current power supply. The direct current power supply is detachably connected to a body 20 of the lighting device to supply power to the body 20 of the lighting device. In this example, the direct current power supply is a battery pack 30, and the battery pack 30 collaborates with a corresponding power supply circuit to supply power to the body 20 of the lighting device. In the subsequent description, the battery pack 30 is used instead of the direct current power supply and is not to limit the present invention. In this example, the battery pack 30 used in the lighting device 200 is substantially the same as a battery pack 30 used in a lighting device 100 in the first example. In some examples, the battery packs 30 in the two examples have different nominal voltages or dimensions.

In this example, the lighting device 200 includes the body 20 of the lighting device and the battery pack 30, where the battery pack 30 is detachably connected to the body 20 of the lighting device.

The body 20 of the lighting device further includes a battery pack receiving portion 270 for detachably connecting the battery pack 30.

In this example, the body 20 of the lighting device is similar to a body 10 of the lighting device. The battery pack receiving portion 270 is provided with a first port connected to the battery pack. The structure of the first port is substantially the same as that of a coupling portion of a power tool adapted to the battery pack, which is configured to couple the battery pack, so that the battery pack 30 can be coupled to the power tool to power the power tool after being detached from the body 20 of the lighting device. The body 20 of the lighting device can be adapted to at least a first battery pack with a first nominal voltage and a second battery pack with a second nominal voltage, where the first nominal voltage is different from the second nominal voltage. The battery pack receiving portion 270 includes the first port (not shown in the figures), and the first port is adapted to the first battery pack with the first nominal voltage and the second battery pack with the second nominal voltage, where the first nominal voltage is different from the second nominal voltage. The first port is configured to be a first input terminal, and the first input terminal is selectively electrically connected to a first output terminal set of the first battery pack and a second output terminal set of the second battery pack.

As shown in FIGS. 12 to 14, the body 20 of the lighting device includes a light housing 210, a light source 250, and a handle housing 230. The light housing 210 forms an accommodation space, and the light source 250 is disposed at least partially in the light housing 210. The light source 250 is configured to emit light to illuminate a work space. The handle housing 230 is rotatably connected to the light housing 210. As shown in FIG. 14, the lighting device 200 further includes a power button 295 for controlling the light source 250 to be lit and extinguished. A controller 292 coupled to the light source 250 and configured to control the light source 250 is further included. The controller 292 adopts a dedicated control chip such as a single-chip microcomputer or an MCU. The controller 292 adjusts and controls the light source 250 according to an operating instruction. A control circuit board 291 includes a PCB and an FPC board. The control circuit board 291 is accommodated in the light housing 210, and the controller 292 and the light source 250 are disposed on the control circuit board 291. The controller 292 and the light source 250 are separately disposed on the control circuit board 291 so that circuit connections inside the lighting device 200 are reduced. In this example, the battery pack receiving portion and the light housing are disposed at two ends of an extension direction of the handle housing one to one so that the user has a relatively large grip area and can conveniently hold the lighting device for work. The battery pack receiving portion and the light housing are disposed at the two ends one to one so that the center of gravity of the whole device can be conveniently placed on the handle housing, and a wrist of the user is subjected to a reduced force during use.

Optionally, the light source 250 may switch between different modes of operation by using the power button 295 or another switching button. The power button 295 is disposed on the control circuit board 291.

In this example, the handle housing 230 includes a first connecting portion 231. The first connecting portion 231 is provided with a first spindle 232 whose centerline is a first axis 201, and the light housing 210 is rotatably connected to the handle housing 230 around the first axis 201. The angle $\alpha$ of rotation of the light housing 210 relative to the handle housing 230 around the first axis 201 is greater than or equal to 180°. Optionally, as shown in FIG. 12, the light housing 210 includes a first position (solid lines) and a second position (dashed lines) relative to the handle housing 230. When the light housing 210 is at the first position, the light housing 210 at least partially overlaps the handle housing 230 in an up and down direction, which may be understood as that when the light housing 210 is at the first position, the lighting device 200 is at a stored position. When the light housing 210 is at the second position, the light housing 210 rotates to a position with the maximum angle, that is, the angle between the same plane of the light housing 210 at the first position and the same plane of the light housing 210 at the second position is a maximum angle of rotation, that is, the angle $\alpha$ of rotation is greater than or equal to 120°. In some examples, the angle $\alpha$ of rotation of the light housing 210 relative to the handle housing 230 around the first axis 201 is greater than or equal to 180°. In some examples, the angle $\alpha$ of rotation of the light housing 210 relative to the handle housing 230 around the first axis 201 is greater than or equal to 210°. In some examples, the angle $\alpha$ of rotation of the light housing 210 relative to the handle housing 230 around the first axis 201 is greater than or equal to 240°. In some examples, the angle $\alpha$ of rotation of the light housing 210 relative to the handle housing 230 around the first axis 201 is greater than or equal to 270°.

The light housing 210 includes a first accommodation portion 211 and a second connecting portion 213. The control circuit board 291 is disposed in the first accommodation portion 211. A lens 212 is disposed on a side surface of the first accommodation portion 211, and the light source 250 is disposed facing the lens 212 so that the light emitted by the light source 250 is emitted through the lens 212. The second connecting portion 213 is rotatably connected to the first accommodation portion 211. The first accommodation portion 211 is rotatably connected to the second connecting portion 213 around a second axis 202. In this example, the second connecting portion 213 defines the second axis 202. Optionally, the second connecting portion 213 or the first accommodation portion 211 is defined as a cylinder, and the central axis of the cylinder is defined as the second axis 202. In this example, the second axis 202 is perpendicular to the first axis 201. Optionally, the angle of rotation of the first accommodation portion 211 relative to the second connecting portion 213 around the second axis 202 is greater than or equal to 180°. In some examples, the angle of rotation of the first accommodation portion 211 relative to the second connecting portion 213 around the second axis 202 is equal to 360° so that the lighting device 200 has an increased illumination range and basically achieves full coverage in space through the rotation around the two rotation axes.

In this example, the power button 295 is disposed at an end of the light housing facing away from the first axis. Optionally, the power button 295 is disposed at an end of the first accommodation portion 211 facing away from the second connecting portion 213. The power button 295 is disposed at the end of the light housing facing away from the first axis. It is to be interpreted that the end of the first accommodation portion 211 facing away from the second connecting portion 213 includes not only a side surface of the first accommodation portion 211 not directly connected to the second connecting portion 213 but also includes a region away from the second connecting portion 213 on a side surface of the first accommodation portion 211 directly connected to the second connecting portion 213. Optionally, as shown in FIG. 14, a split S is set to divide a housing of the first accommodation portion 211 into two parts, where a region at an end facing the second connecting portion 213 is between the split S and the second connecting portion 213, and a region at an end facing away from the second connecting portion 213 is on the other side of the split S.

In this example, the battery pack 30 is detachably connected to the battery pack receiving portion 270 along a direction of a third axis 203, and the third axis 203 is perpendicular to the first axis 201. Optionally, the third axis 203 is perpendicular to the second axis 202.

As shown in FIGS. 12 and 13, one end of the handle housing 230 forms or is connected to the battery pack receiving portion 270, and the other end of the handle housing 230 forms or is connected to the first connecting portion 231. A grip 233 for the user to hold the lighting device 200 is disposed between the battery pack receiving portion 270 and the first connecting portion 231, making it convenient for the user to hold the lighting device 200 to check the work region.

In some examples, the lighting device 200 further includes a hanging portion 234, and the hanging portion 234 is disposed at an end of the handle housing 230 facing away from the battery pack receiving portion 270. The hanging portion 234 keeps the lighting device 200 suspended with the battery pack 30 facing downward. In this example, the hanging portion 234 is a hook. Optionally, the hanging portion 234 is a hanging rope, a clip, or a ring-shaped structure.

In this example, the light source 250 includes one or more LEDs. The light source 250 may be LED light beads. In other examples, an additional or alternative light source 250 may be included, such as COB light beads. The light source 250 can produce light with a brightness of 500 lumens or higher in a bright mode. In some examples, the light source 250 may operate in different modes such as the bright mode and a power saving mode. In some examples, the light source 250 can produce light with a brightness of 500 lumens or higher in the bright mode and produce light with a brightness of 250 lumens or lower in the power saving mode. In some examples, the light source 250 can produce light with a brightness of 600 lumens in the bright mode and produce light with a brightness of 250 lumens in the power saving mode. In other examples, the light source 250 may operate in more different modes, such as different color temperatures or different work modes such as flashing or breathing. In this example, the battery pack 30 has a capacity of 4.0 Ah. The battery pack 30 can power the light source 250 in the bright mode for at least 12 hours and power the light source 250 in the power saving mode for at least 24 hours. In some examples, the battery pack can power the light source 250 in the bright mode for 5 to 8 hours and power the light source 250 in the power saving mode for 10 to 16 hours. In further examples, depending on the capacity of the battery pack 30, the light source 250 in either mode can be powered for a longer time.

In this example, the power button 295 includes a switch 2951 and an operating member 2952, and the operating member 2952 is disposed on the light housing 210 to be convenient for the user to operate. The switch 2951 is disposed on the control circuit board 291.

In some examples, the lighting device 200 further includes a charging port and a charging port cover. The charging port is disposed on the battery pack receiving portion 270. The charging port cover is pivotally connected to the handle housing 230. The charging port may supply power to an external device. For example, the external device includes, but is not limited to, an electronic device of the user, including a mobile phone, a tablet computer, a computer, and a wearable device. When the user needs to charge the mobile phone, the mobile phone is placed and connected to the charging port via a data cable to be charged through the charging port. The charging port is specifically one or more of a USB interface, a Type-C interface, and a lighting interface. The battery pack 30 on the lighting device 200 may be charged through the charging port. Thus, when the lighting device 200 is inconvenient to charge, the battery pack 30 may be charged by using the remaining power of the mobile phone or some other adaptable devices. Alternatively, the charging port is connected to an onboard power supply and the battery pack 30 is charged by the onboard power supply. Alternatively, the lighting device 200 is directly powered through the charging port.

Figure 15:
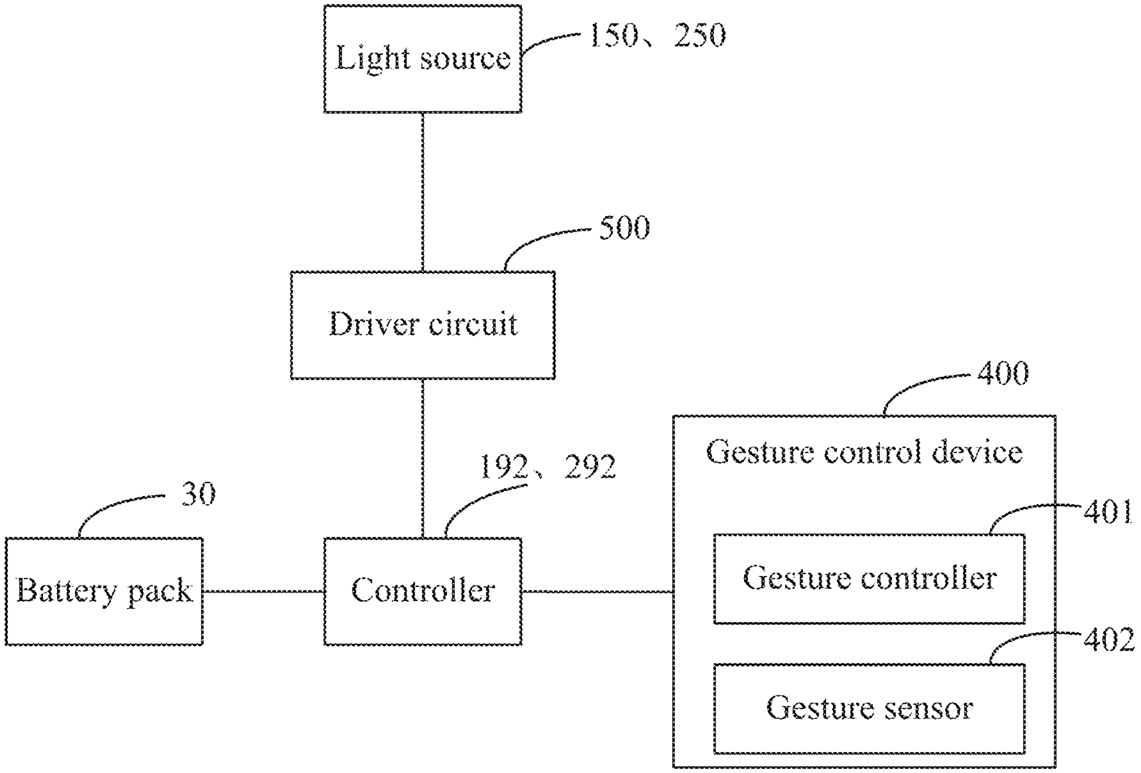
FIG. 15 is a circuit block diagram according to an example of the present application.

As shown in FIG. 15, each lighting device 100/200 described above includes a gesture control device 400, where the gesture control device includes a gesture controller 401 and a gesture sensor 402. The gesture controller 401 is connected to or integrated with the controller 192/292. The gesture controller 401 adopts a dedicated control chip, for example, a single-chip microcomputer or an MCU. In this example, the position and form of the gesture controller 401 are not to limit the essence of the present application.

The lighting device 100/200 includes a driver circuit 500, and the driver circuit 500 is connected to the controller 192/292 and the light source 150/250. In this example, the driver circuit 500 is connected to the controller 192/292, the gesture controller 401, and the light source 150/250. That is to say, the gesture controller 401 may directly control the light source 150/250 through the driver circuit 500, or the gesture controller 401 may send a signal to the controller 192/292, and the controller 192/292 controls the light source 150/250 through the driver circuit 500 after modulation. The gesture controller 401 is mainly configured to capture gesture information of the user, convert the gesture information into a corresponding digital signal, and output the digital signal.

In some examples, the gesture controller 401 further includes the gesture sensor 402, and the gesture sensor 402 is connected to a chip. The gesture sensor 402 includes at least one of an infrared sensor or other light wave sensors. The gesture controller 401 measures a distance change by calculating a propagation time of light and recognizes a gesture action.

In this example, the digital signal output from the gesture controller 401 is configured to control at least one of mode switching, brightness switching, color temperature switching, or a lighted state of the light source 150/250. In some examples, the digital signal output from the gesture controller 401 is configured to control the light source 150/250 to be lit and extinguished to replace the function of the power button. Thus, the user does not need to contact the light body, and the use of the user is facilitated. For example, when a hand is within a certain distance from the lighting device 100/200, the gesture sensor 402 detects a signal, and the controller 192/292 processes the signal and sends a signal for lighting the light source 150/250 to light up the light source 150/250. When the gesture sensor 402 detects a signal again, the controller 192/292 adjusts the brightness of the light source 150/250 until the light source 150/250 is extinguished. When the hand with a certain gesture is within a certain distance from the lighting device 100/200, the gesture sensor 402 detects a signal, and the controller 192/292 processes the signal so that corresponding functions are implemented, such as the stepless adjustment of the brightness of the light or the control of color changes of the light.

In some examples, the gesture sensor 402 includes at least one of an image sensor or a touchscreen. The touchscreen and the image sensor are mainly configured to capture the gesture information of the user. The gesture of the user may be specifically a simple gesture action such as a movement of the hand from right to left, a movement of the hand from top to bottom, a movement of the hand toward the gesture controller 401, and a grasp of the hand. A data processing element in a chip of the gesture controller 401 converts a touch signal collected by the touchscreen or the gesture action collected by the image sensor into the digital signal, and the converted digital signal is transmitted to the controller 192/292. The controller 192/292 compares the digital signal with preset internal digital instructions. The controller 192/292 selects a corresponding illumination control signal according to the comparison to control a state of the light source 150/250. For example, when the hand moves from bottom to top, the light source 150/250 increases in brightness; when the hand moves from top to bottom, the light source 150/250 decreases in brightness; when the hand moves from left to right, the light source 150/250 is lit; when the hand moves from right to left, the light source 150/250 is extinguished; when the hand makes a particular gesture such as OK, the light enters a color adjustment or color temperature adjustment mode or a lighted state control mode.

Figure 16:
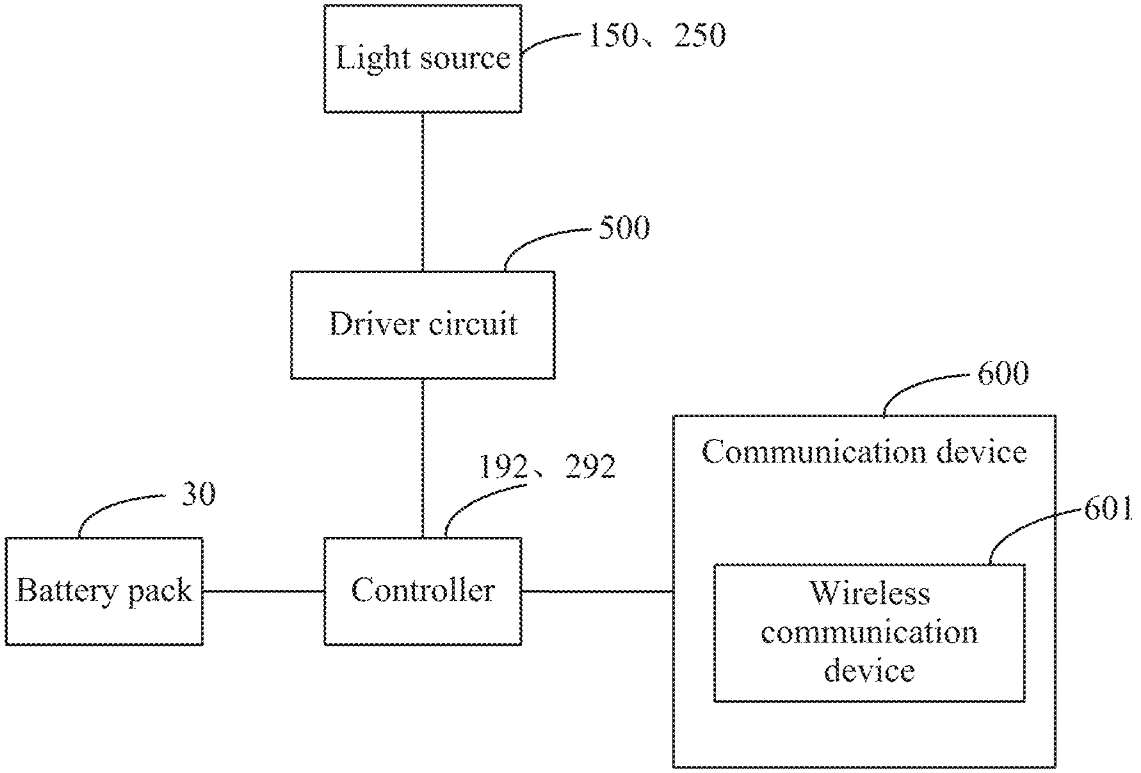
FIG. 16 is a second circuit block diagram according to an example of the present application.

As shown in FIG. 16, in some examples, each lighting device 100/200 includes a communication device 600 configured to receive an operation signal from an external device. In some examples, the communication device 600 includes a wireless communication device 601 such as a long-range wireless network. The wireless communication device 601 performs communication using other protocols (such as Wireless Fidelity (Wi-Fi), cellular protocols, and proprietary protocols) on different types of wireless networks. For example, the wireless communication device 601 may be configured to communicate via Wi-Fi over the Internet, a local area network (LAN), a wide area network (WAN), or a combination thereof or to communicate through a piconet (such as infrared communication or near-field communication (NFC)). In other examples, the wireless communication device 601 may be a short-range communication protocol (such as Bluetooth). In other examples, the wireless communication device 601 may use a wired network using, for example, a serial protocol (such as USB, USB-C, or FireWire). The external device includes a mobile device such as a smartphone, a tablet computer, a cellular phone, a laptop computer, or a smart wearable device. The user communicates with the communication device 600 through the external device, the communication device 600 sends a received operating instruction to the controller 192/292 in the form of a digital signal, and the controller 192/292 controls the light source 150/250. In this example, the controller 192/292 is configured to control at least one of a color temperature, color, or lighting form (such as a breathing effect, flowing effect, or flashing effect) of the light source 150/250. For example, color temperature adjustment includes a temperature range of 2700-3000 kelvins of a warm light, neutral color temperatures of 3000-4500 kelvins, and cool color temperatures of 4500-6500 kelvins. In some examples, an ambient light detection sensor is further included so that the controller 192/292 automatically adjusts the brightness, color temperature, or color of the lighting according to the intensity or color temperature of light in the surrounding work environment. The user is provided with a comfortable illumination environment.

Figure 17:
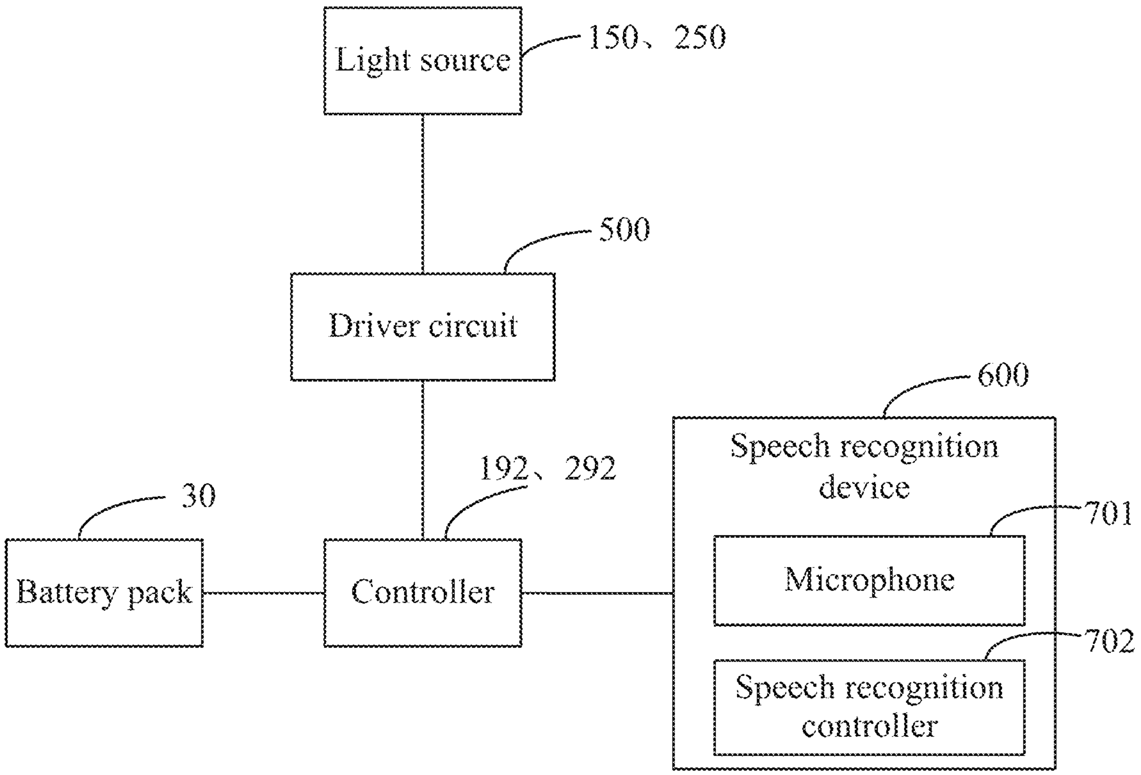
FIG. 17 is a third circuit block diagram according to an example of the present application.

As shown in FIG. 17, in some examples, each lighting device 100/200 includes a speech recognition device 700. The speech recognition device 700 includes a circuit of a microphone 701 for collecting a speech signal and a speech recognition controller 702 that is electrically connected to the circuit of the microphone 701 and configured to recognize the speech signal. The speech recognition controller 702 adopts a dedicated chip, for example, a single-chip microcomputer or an MCU. In collaboration with the circuit of the microphone 701, the speech recognition controller 702 can implement the speech recognition of a small number of fixed words of a non-specific person, convert the signal into a digital signal, and transmit the converted digital signal to the controller 192/292. The driver circuit 500 enables the user to control the lighting, extinguishing, and light emission mode of the light source 150/250 through voice. In some examples, in collaboration with the circuit of the microphone 701, the speech recognition controller 702 can implement the speech recognition of a small number of fixed words of a non-specific person and convert the signal into a corresponding waveform. The speech recognition controller 702 controls the driver circuit 500 to control the lighting, extinguishing, and light emission mode of the light source 150/250.

It is to be understood that the lighting device 100/200 may be provided with one or more of the gesture control device 400, the communication device 600, and the speed recognition device 700 for use in coordination, and combinations of the preceding multiple functions belong to the disclosure of the present application.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

What is claimed is:

1. A lighting device, comprising:

a light housing;

a light source disposed at least partially in the light housing;

a battery pack having a height dimension H1; and a battery pack receiving portion formed on or connected to the light housing;

wherein the light housing is adapted to be placed into a first state having a height dimension H2 and a second state having a height dimension H3 along a height direction of the light housing, the height dimension H2 in the first state is less than the height dimension H3 in the second state, and the height dimension H2 in the first state is less than or equal to the height dimension H1 of the battery pack;

wherein the light housing forms an accommodation space, the accommodation space comprises a first accommodation portion consistent in volume in the first state and the second state and a second accommodation portion changing in volume in the first state and the second state, and the lighting device further comprises an air pressure balancing portion so that air pressure in the second accommodation portion remains basically unchanged when the second accommodation portion changes in volume.

2. The lighting device according to claim 1, wherein the battery pack, the battery pack receiving portion, and the light housing define a height dimension of the lighting device, and when the light housing is in the second state, a ratio of a height dimension Hex of the lighting device to the height dimension H1 of the battery pack is greater than or equal to 2.5.

3. The lighting device according to claim 1, wherein the light housing defines a central axis, a direction of the central axis is parallel to the height direction, and the light housing extends and shortens along the direction of the central axis.

4. The lighting device according to claim 3, wherein the light housing comprises a flexible housing comprising a flexible material.

5. The lighting device according to claim 4, wherein the flexible housing comprises flexible portions in a plurality of layers, the flexible portions decrease in dimension layer by layer along a radial direction of the flexible housing, and the flexible housing deforms to remain in the first state or the second state.

6. The lighting device according to claim 4, wherein the light housing further comprises a mounting portion for forming or connecting the battery pack receiving portion, and the mounting portion supports the flexible housing.

7. The lighting device according to claim 6, wherein a hook is provided on the mounting portion, the hook is movable into an unfolded state, and the hook in the unfolded state keeps the lighting device suspended with the battery pack facing upward.

8. The lighting device according to claim 7, wherein the hook in the unfolded state keeps the lighting device suspended in a vertical direction and with the battery pack facing upward.

9. The lighting device according to claim 6, wherein the mounting portion is provided with a support portion, the support portion comprises a support surface, the support surface is located above the light source, and when the light housing is in the first state, the support portion keeps the light housing above the light source.

10. The lighting device according to claim 1, wherein the air pressure balancing portion comprises air holes for making an inside of the second accommodation portion communicate with an outside of the second accommodation portion, and a porous dust pad is provided on each of the air holes.

11. The lighting device according to claim 10, wherein at least a part of the air holes are disposed on the battery pack receiving portion.

12. The lighting device according to claim 1, wherein the battery pack is detachably connected to the battery pack receiving portion, the battery pack receiving portion comprises a first port, and a nominal voltage of the battery pack is greater than or equal to 10.8 V.

13. The lighting device according to claim 12, further comprising:

a power button for controlling the light source to be lit and extinguished;

a controller coupled to the light source and configured to control the light source; and a control circuit board on which the controller, the power button, the light source, and the first port are disposed.

14. The lighting device according to claim 13, wherein the control circuit board is disposed at least partially in the light housing.

15. A lighting device, comprising:

a light housing;

a light source disposed at least partially in the light housing;

a battery pack having a height dimension H1; and a battery pack receiving portion formed on or connected to the light housing;

wherein the light housing is adapted to be placed into a first state having a height dimension H2 and a second state having a height dimension H3 along a height direction of the light housing, the height dimension H2 in the first state is less than the height dimension H3 in the second state, and the height dimension H2 in the first state is less than or equal to the height dimension H1 of the battery pack;

wherein the light housing defines a central axis, a direction of the central axis is parallel to the height direction, and the light housing extends and shortens along the direction of the central axis;

wherein the light housing comprises a flexible housing comprising a flexible material, the flexible housing comprises flexible portions in a plurality of layers, the flexible portions decrease in dimension layer by layer along a radial direction of the flexible housing, and the flexible housing deforms to remain in the first state or the second state.

16. The lighting device according to claim 15, wherein the battery pack, the battery pack receiving portion, and the light housing define a height dimension of the lighting device, and when the light housing is in the second state, a ratio of a height dimension Hex of the lighting device to the height dimension H1 of the battery pack is greater than or equal to 2.5.

17. The lighting device according to claim 15, wherein the battery pack is detachably connected to the battery pack receiving portion, the battery pack receiving portion comprises a first port, and a nominal voltage of the battery pack is greater than or equal to 10.8 V.

18. A lighting device, comprising:

a light housing;

a light source disposed at least partially in the light housing;

a battery pack having a height dimension H1; and a battery pack receiving portion formed on or connected to the light housing;

wherein the light housing is adapted to be placed into a first state having a height dimension H2 and a second state having a height dimension H3 along a height direction of the light housing, the height dimension H2 in the first state is less than the height dimension H3 in the second state, and the height dimension H2 in the first state is less than or equal to the height dimension H1 of the battery pack;

wherein the light housing defines a central axis, a direction of the central axis is parallel to the height direction, and the light housing extends and shortens along the direction of the central axis;

wherein the light housing comprises a flexible housing comprising a flexible material, the light housing further comprises a mounting portion for forming or connecting the battery pack receiving portion, and the mounting portion supports the flexible housing.

19. The lighting device according to claim 18, wherein the battery pack, the battery pack receiving portion, and the light housing define a height dimension of the lighting device, and when the light housing is in the second state, a ratio of a height dimension Hex of the lighting device to the height dimension H1 of the battery pack is greater than or equal to 2.5.

20. The lighting device according to claim 18, wherein the battery pack is detachably connected to the battery pack receiving portion, the battery pack receiving portion comprises a first port, and a nominal voltage of the battery pack is greater than or equal to 10.8 V.

* * * * *